(12) United States Patent
Ikeda

(10) Patent No.: US 8,640,258 B2
(45) Date of Patent: Jan. 28, 2014

(54) SERVICE PROVIDING SYSTEM

(75) Inventor: Kiyokazu Ikeda, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 12/762,688

(22) Filed: Apr. 19, 2010

(65) Prior Publication Data

US 2010/0262364 A1    Oct. 14, 2010

Related U.S. Application Data

(63) Continuation of application No. 10/088,148, filed as application No. PCT/JP01/05664 on Jun. 29, 2001, now abandoned.

(30) Foreign Application Priority Data

Jun. 29, 2000 (JP) ................... P2000-201462
Jun. 21, 2001 (JP) ................... P2001-188724

(51) Int. Cl.
*G06F 21/00* (2013.01)
(52) U.S. Cl.
USPC .............. 726/29; 726/26; 726/27; 726/28
(58) Field of Classification Search
USPC .................. 713/155; 726/26, 27, 28, 29
See application file for complete search history.

(56) References Cited

U.S. PATENT DOCUMENTS

| | | | |
|---|---|---|---|
| 5,025,261 A | 6/1991 | Ohta et al. | |
| 5,375,059 A | 12/1994 | Kyrtsos et al. | |
| 5,390,125 A | 2/1995 | Sennott et al. | |
| 5,587,904 A | 12/1996 | Ben-Yair et al. | |
| 5,606,506 A | 2/1997 | Kyrtsos | |
| 5,610,815 A | 3/1997 | Gudat et al. | |
| 5,727,057 A | 3/1998 | Emery et al. | |
| 5,738,583 A | 4/1998 | Comas et al. | |
| 5,912,643 A | 6/1999 | Chew et al. | |
| 5,923,286 A | 7/1999 | Divakaruni | |
| 5,999,808 A | 12/1999 | LaDue | |
| 6,014,103 A | 1/2000 | Sumner et al. | |

(Continued)

FOREIGN PATENT DOCUMENTS

| | | |
|---|---|---|
| JP | 08-305282 | 11/1996 |
| JP | 10-255022 | 9/1998 |

(Continued)

OTHER PUBLICATIONS

Diagnositics—Navigation System, 2005 Highlander Repair Manual (RM1144U). 2005. pp. 1-6. http://highlanderclub.ru/files/manual/04/219o9/cistasdes.pdf.

(Continued)

*Primary Examiner* — Tamara T Kyle
(74) *Attorney, Agent, or Firm* — Lerner, David, Littenberg, Krumholz & Mentlik, LLP

(57) ABSTRACT

To expand the after-sales services offered for a product purchased by a user, a service server that provides services accesses a specified navigation system, which is the product purchased by the user, using a device ID that is uniquely assigned to the navigation system, and then transmits service information to the specified navigation system. In other words, the service server actively accesses a navigation system, which is fundamentally one of countless terminal apparatuses on a communication network, and provides service information to that navigation system. By operating in this way, a great variety of services can be provided whenever appropriate.

21 Claims, 16 Drawing Sheets

(56) References Cited

U.S. PATENT DOCUMENTS

| | | | |
|---|---|---|---|
| 6,104,815 A | 8/2000 | Alcorn et al. | |
| 6,157,891 A | 12/2000 | Lin | |
| 6,167,347 A | 12/2000 | Lin | |
| 6,230,098 B1 | 5/2001 | Ando et al. | |
| 6,246,958 B1 | 6/2001 | Hirono | |
| 6,253,114 B1 | 6/2001 | Takihara | |
| 6,416,414 B1 | 7/2002 | Stadelmann | |
| 6,466,862 B1 | 10/2002 | DeKock et al. | |
| 6,470,180 B1 | 10/2002 | Kotzin et al. | |
| 6,501,958 B1 | 12/2002 | Hwang et al. | |
| 6,639,541 B1 | 10/2003 | Quintana et al. | |
| 6,650,892 B1 | 11/2003 | Thiriet | |
| 6,718,263 B1 | 4/2004 | Glass et al. | |
| 6,735,435 B2 | 5/2004 | Newell et al. | |
| 6,778,820 B2 | 8/2004 | Tendler | |
| 6,847,825 B1 * | 1/2005 | Duvall et al. | 455/456.3 |
| 6,856,820 B1 | 2/2005 | Kolls | |
| 6,895,238 B2 | 5/2005 | Newell et al. | |
| 6,954,764 B2 | 10/2005 | Biswas et al. | |
| 7,236,462 B2 | 6/2007 | Davenport et al. | |
| 7,251,561 B2 | 7/2007 | Dotan et al. | |
| 7,257,386 B1 | 8/2007 | McDonnell et al. | |
| 7,392,226 B1 * | 6/2008 | Sasaki et al. | 705/64 |
| 2001/0020216 A1 | 9/2001 | Lin | |
| 2002/0016171 A1 | 2/2002 | Doganata et al. | |
| 2002/0049529 A1 | 4/2002 | Ikeda | |
| 2002/0057283 A1 | 5/2002 | Biswas et al. | |
| 2002/0061741 A1 | 5/2002 | Leung et al. | |
| 2002/0168967 A1 | 11/2002 | Clapper | |
| 2003/0139190 A1 | 7/2003 | Steelberg et al. | |
| 2004/0008660 A1 * | 1/2004 | Lee | 370/349 |
| 2005/0043038 A1 * | 2/2005 | Maanoja et al. | 455/456.1 |
| 2005/0078652 A1 * | 4/2005 | Rousseau et al. | 370/349 |
| 2005/0102074 A1 | 5/2005 | Kolls | |
| 2006/0046740 A1 | 3/2006 | Johnson | |
| 2009/0094164 A1 * | 4/2009 | Fontaine et al. | 705/67 |

FOREIGN PATENT DOCUMENTS

| | | | |
|---|---|---|---|
| JP | 10255022 A | * | 9/1998 |
| JP | 10336768 A | * | 12/1998 |
| JP | 11-095657 | | 4/1999 |
| JP | 11260045 A | * | 9/1999 |
| JP | 2000036097 A | | 2/2000 |
| JP | 2000092227 A | | 3/2000 |
| JP | 2000092567 A | | 3/2000 |
| JP | 2000-321079 A | | 11/2000 |
| JP | 2001075967 A | | 3/2001 |

OTHER PUBLICATIONS

Office Action from Japanese Application No. 2001-188724, dated Aug. 17, 2010.

Office Action from Japanese Application No. 2011-148879, dated Mar. 5, 2013.

* cited by examiner

SERVICE PROVIDING SYSTEM

CROSS-REFERENCE TO RELATED APPLICATIONS

This application is a continuation, of U.S. application Ser. No. 10/088,148, filed on Jun. 24, 2002, which is a national phase entry under 35 U.S.C. §371 of International Application No. PCT/JP01/05664, filed Jun. 29, 2001, which claims priority from Japanese Patent Application No. P2001-188724 filed in the Japanese Patent Office on Jun. 21, 2001 and of Japanese Patent Application No. P2000-201462 filed in the Japanese Patent Office on Jun. 29, 2000, the disclosures of which are incorporated herein by reference.

TECHNICAL FIELD

The present invention relates to a system constructed so that an electronic appliance mounted in a moving body, such as a car and the like, can communicate via a communications network with a mobile personal terminal apparatus such as a server, a mobile phone and the like. This invention relates to a system in which a user that has purchased the electronic appliance can have the electronic appliance receive transmitted data and execute various operations in accordance with the received data, thereby allowing the user to make use of a variety of services provided by the system.

BACKGROUND ART

Car navigation systems are becoming increasingly popular. The basic function of such devices is to locate the current position of a moving car, for example, and to display this position on a map to inform the user of the current position of the car. In recent years, some car navigation systems have been additionally equipped with mobile wireless terminal apparatuses that enable them to connect to the Internet. As a usage pattern thereof, this kind of navigation system may be used to connect to websites located on the Internet to obtain information about shops and restaurants located in a specific area, upcoming events, the weather, etc. This information is then displayed to the user via the display unit of the car navigation system.

When a customer purchases a product, it is common for the manufacturer or retail outlet to provide a variety of useful services to the customer. Such services are often referred to as "after-care" or "after-sales services". The kind of car navigation system mentioned above is of course itself a product, which has been purchased by the owner of the car in which it is fitted, for example. Accordingly, if the manufacturer of this car navigation system or the retail outlet that sold it were able to offer an after-sales service for the system, this would be very convenient for the user and would increase an added value for those companies' products. At present, businesses are limited to providing after-sales services through notifications sent through the mail or by electronic mail. This places a restriction on what kind of services may be provided.

If businesses were able to set up a service providing server on the Internet, for example, and directly transmit data related to services to car navigation systems that are capable of connecting to the Internet, it would become possible to provide after-sales services to users in a more direct manner.

With current technology, a car navigation system is only able to connect to the Internet, so that it is not possible for a server to access a car navigation system as in the above example. Therefore, even if services were provided using the Internet connectability of a conventional car navigation system, the user would have to know the address (URL-Uniform Resource Locator) of the server providing the services and operate the car navigation system so as to make the car navigation system access the service providing server. Putting this in other words, when the business needs to provide a service to a customer, it is not able to access the car navigation system and immediately provide the service. This prevents businesses from providing a full range of services to customers.

DISCLOSURE OF THE INVENTION

The present invention was implemented in view of the problems described above, and provides service providing systems with the constructions described below.

The service providing system according to a first aspect of the present invention is composed of at least a plurality of electronic appliances, a service server, and a communication network, each electronic appliance being equipped with a wireless communication terminal function, being mounted in a moving body and being assigned a unique device ID, and the service server having a function for providing a predetermined service and storing the unique device ID for each electronic appliance to which services can be provided.

This service providing system is further equipped with a transmission means for using a device ID to provide access, via the communication network, from the service server to a specified electronic appliance to which a specified service needs be provided and transmitting service information, which has a predetermined content for realizing the specified service, to the specified electronic appliance.

Another aspect of the present invention is a service providing system, including a plurality of electronic appliances, a service server, and a communication network, each electronic appliance being equipped with a wireless communication terminal function, being mounted in a moving body and being assigned a unique device ID, and the service server having a function for providing a predetermined service and storing the unique device ID for each electronic appliance to which services can be provided, the service providing system comprising: first transmission means for providing access, via the communication network, from an electronic appliance to the service server and transmitting information, which has a predetermined content that can be used by a specified service, from the electronic appliance to the service server; and second transmission means for using a device ID to provide access, via the communication network, from the service server to a specified electronic appliance to which a specified service needs be provided and transmitting service information, which has a predetermined content for realizing the specified service, to the specified electronic appliance.

Another aspect of the present invention is a service providing system, including a plurality of electronic appliances, a plurality of mobile communication terminal apparatuses, and a communication network, each electronic appliance being equipped with a wireless communication terminal function, being mounted in a moving body and being assigned a unique device ID, and each mobile communication terminal apparatus being assigned a unique terminal ID, the service providing system comprising: transmission means for using a device ID to provide access, via the communication network, from one of the mobile communication terminal apparatuses to a specified electronic appliance, and transmitting service information, which includes a predetermined content for realizing a specified service to be provided, to the specified electronic appliance.

Another aspect of the present invention is a service providing system, including a plurality of electronic appliances, a plurality of mobile communication terminal apparatuses, and a communication network, each electronic appliance being equipped with a wireless communication terminal function, being mounted in a moving body and being assigned a unique device ID, and each mobile communication terminal apparatus being assigned a unique terminal ID, the service providing system comprising: first transmission means for providing access, via the communication network, from an electronic appliance to one of the mobile communication terminal apparatuses and transmitting information, which has a predetermined content that can be used by a specified service, from the electronic appliance to the mobile communication terminal apparatus; and second transmission means for using a device ID to provide access, via the communication network, from one of the mobile communication terminal apparatuses to a specified electronic appliance and transmitting service information, which has a predetermined content for realizing a specified service, to the specified electronic appliance.

By having the constructions described above, an electronic appliance that is equipped with a wireless communication terminal function and fitted in a moving body is the target of the services provided in the present invention, which is to say, the target of service information that is transmitted. In each of the above constructions, a device ID that is uniquely assigned to each electronic appliance is used to access a specified electronic appliance, thereby making it possible to transmit service information to the specified electronic appliance. In other words, service information can be transmitted by actively performing access to an electronic appliance that fundamentally exists as one of many and unspecific terminal apparatuses on a communication network.

As a different aspect of the present invention, the following construction may be used.

A service providing system is composed of an electronic appliance, a communication network, a communication terminal apparatus, and an authentication server, the electronic appliance being one of (i) an electronic appliance that is mounted in a moving body and is equipped with a mobile communication terminal function and (ii) a mobile communication terminal apparatus, the communication terminal apparatus being set up with a fixed access path to the communication network, and the authentication server being connected to the communication network, the service providing system comprising: access means that enables the communication terminal apparatus to access one of the electronic appliances via the communication network using a device ID that has been assigned uniquely to the electronic appliance, the communication terminal apparatus accessing the electronic appliance only through the authentication server; terminal ID generating means, provided on the communication network, for generating a terminal ID for the communication terminal apparatus using information that identifies an access path by which the communication terminal apparatus accesses the communication network; authentication process means, provided in the authentication server, for using the terminal ID to perform a authentication process for the communication terminal apparatus that has accessed the authentication server and allowing the communication terminal apparatus to access the electronic appliance only when the communication terminal apparatus has been authenticated; and transmission/reception means for receiving and transmitting service information, which has a predetermined content for realizing a specified service, between the communication terminal apparatus that has been authenticated by the authentication process means and the electronic appliance.

With the above construction, a communication terminal apparatus is set up in an essentially static manner in the home or at a business, for example, so that the access path by which the communication terminal apparatus accesses the communication network is fixed. When communication is performed with an electronic appliance that is conceived as being something that moves due to it having been mounted in a moving body or being carried by a user, the communication terminal apparatus can access a specified electronic appliance by using the device ID of the electronic appliance. Once access has been performed, a desired service can be provided through the transmitting and receiving of service information.

Putting this in other words, with the above construction also, services can be provided by actively performing access to an electronic appliance that fundamentally exists as one of many and unspecific terminal apparatuses on a communication network and transmitting information to and from the electronic appliance. In addition, with the above construction, access from the communication terminal apparatus to the electronic appliance is performed via an authentication server. An authentication process is performed using a terminal ID that is generated during access, and access is performed from the communication terminal apparatus to the electronic appliance only after the access has been authenticated.

By doing so, the provision of services can be restricted to users whose terminal IDs have been registered. Putting this in other words, users that do not have the right to make use of services, such as users who have not paid the required fees, can be prevented from making use of the provided services.

The terminal ID is generated using information that identifies the access path taken from the communication terminal apparatus to at least the communication network. While it would be easy for users to tamper with an ID that corresponds to an address or a serial number of the communication terminal apparatus, it is virtually impossible for a user to tamper with the information that specifies the access path since such information is managed by a communication service provider. As a result, the terminal IDs used in the present invention are safe from tampering.

BEST MODE FOR CARRYING OUT THE PRESENT INVENTION

The following describes two service providing systems that are embodiments of the present invention. These service providing systems provide services to a user who has purchased a car navigation system that is fitted in a car, with the provided services including at least an after-sales service for the car navigation system.

The present embodiments are described in the following order.

Figure 1:
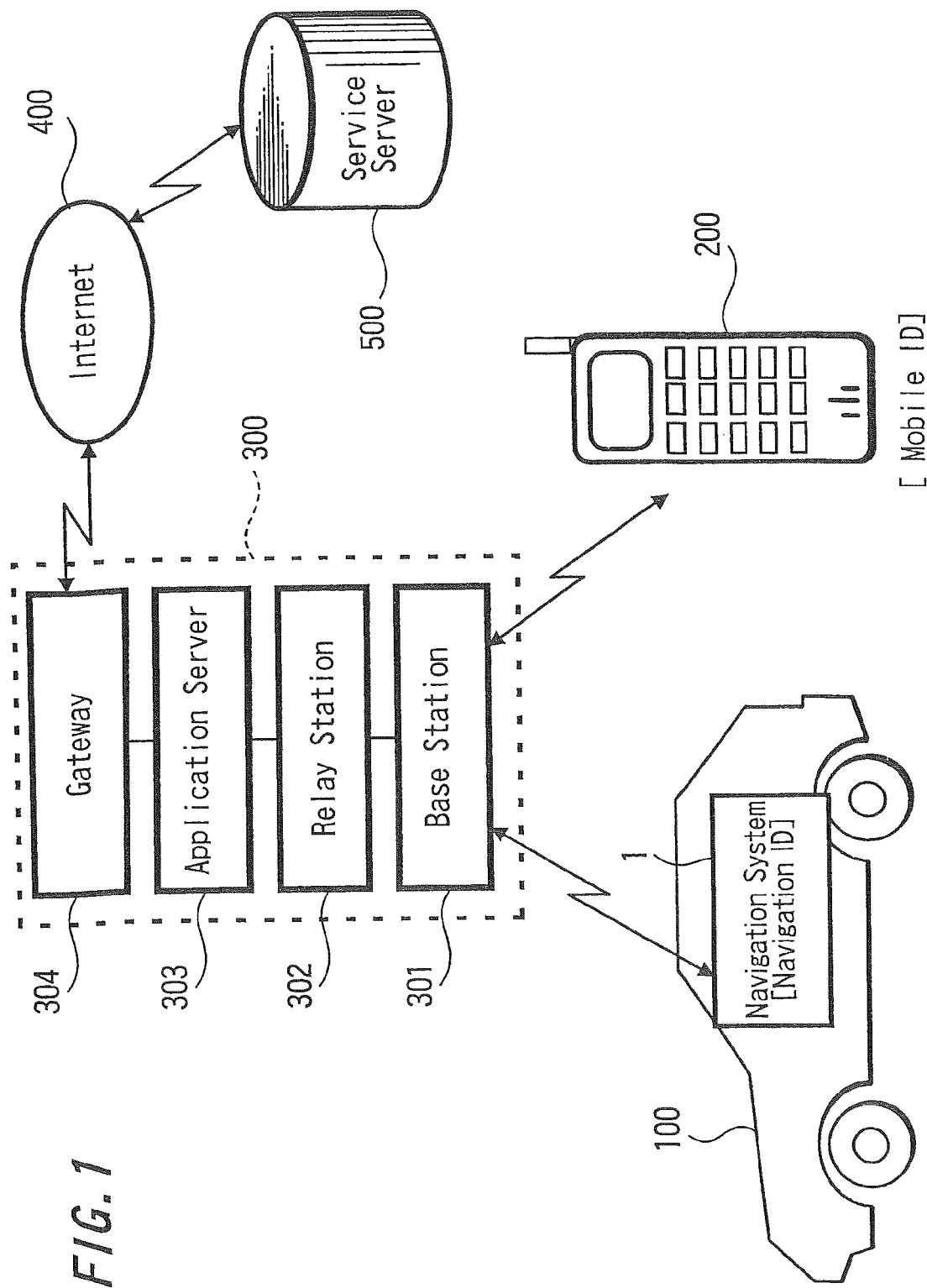
FIG. 1 shows an example construction for a service providing system according to a first embodiment of the present invention.

1. Service Providing System (First Embodiment)
1-1. Overall Construction
1-2. Overall Construction of a Navigation System
1-3. Internal Construction of a Main Navigation Unit
1-4. Internal Construction of a Mobile Phone
1-5. Internal Construction of an Application Server
1-6. Internal Construction of a Service Server
2. Example of Service Provision by the Present System
3. Example Procedure
4. Service Providing System (Second Embodiment)
4-1. Overall Construction
4-2. Internal Construction of a Personal Computer
4-3. Internal Construction of an Authentication Server
4-4. Example of Service Provision by the Present System
4-5 Structure of the Authenticated User Database
4-6. Example Procedure 1. Service Providing System First Embodiment 1-1. Overall Construction FIG. 1 shows a service providing system that is a first embodiment of the present invention.

A car 100 is equipped with a navigation system 1. This navigation system 1 is based on what is usually referred to as a car navigation apparatus, and includes a security system to prevent against theft of the vehicle and a communication terminal apparatus or the like that is capable of data communication via a wireless telephone communication network 300.

The services provided by the service providing system of the present embodiment can be utilized by the owner of the car 100 who has purchased the navigation system 1.

A mobile phone 200 is capable of communicating using a telephone line via the wireless telephone communication network 300. As one example, this mobile phone 200 may be registered at a communications company that operates the wireless telephone communication network 300 in the name of the user of the navigation system 1. Data communication can be performed via the mobile phone 200 by connecting to the Internet.

The wireless telephone communication network 300 is composed of equipment for enabling mobile communication to be performed between wireless terminal apparatuses, such as mobile phones and, in the case of the present embodiment, a wireless terminal apparatus provided in a car navigation apparatus. As shown in FIG. 1, the wireless telephone communication network 300 is composed of a base station 301, a relay station 302, an application server 303, and a gateway 304.

The base station 301 and relay station 302 enable wireless communication to be performed between wireless terminal apparatuses, for example. The application server 303 provides the necessary functions when a wireless terminal apparatus connects to the Internet.

The application server 303 performs the process that is required for an Internet accessible function provided by the wireless communication company in question, for example. The data processed by the application server 303 is converted via the gateway 304 so that as a result, a wireless terminal apparatus connected to the wireless telephone communication network 300 can connect to the Internet 400.

In reality, a variety of servers are connected to one another on the Internet, though in the present embodiment a service server 500 is provided, as shown in FIG. 1. This service server 500 is constructed so as to be able to provide the user with various services. Note that examples of the services that are provided to users are described later in this specification. It should also be noted that while only one service server 500 is shown in FIG. 1, a plurality of servers may be provided for each business or department that provides a service. In the example that is described later, the provided services include an after-sales service for the navigation system 1 purchased by the user and a service that allows the user to utilize the security system that forms part of the navigation system 1. In this example, these two services may be provided separately, by a service server set up by the manufacturer of the navigation system 1 and a service server set up by a company that operates the security system.

When the above construction is used, mobile terminal apparatuses, which here means devices like the navigation system 1 and mobile phone 200, can connect to the Internet 400, thereby enabling them to access all kinds of websites and other information. As an additional service, the transmission and reception of electronic mail is also possible. It should also be obvious that the mobile phone 200 may be used to make telephone calls via a standard telephone network.

1-2. Overall Construction of a Navigation System

Figure 2:
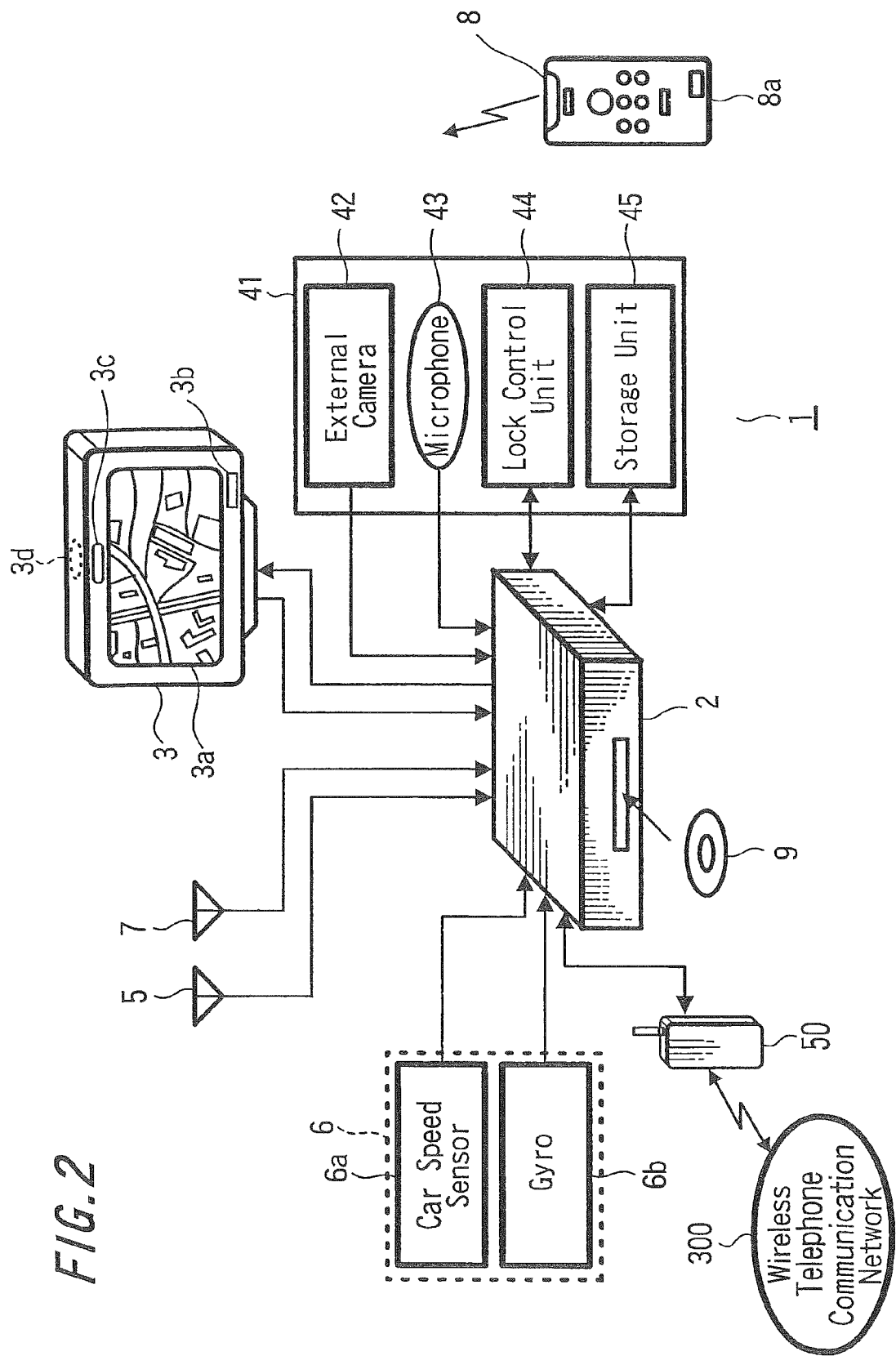
FIG. 2 is an explanatory diagram of an example construction for a navigation system according to the present embodiment.

FIG. 2 is a schematic construction of an overall navigation system according to the present embodiment.

As shown in FIG. 2, the navigation system 1 of the present embodiment may include a main navigation unit 2, a display monitor unit 3, a GPS (Global Positioning System) antenna 5, a traffic information reception antenna 7, an autonomous navigation unit 6, a communication terminal apparatus 50, a security system unit 41, and a remote controller 8.

The detailed construction of the main navigation unit 2 is described in detail later in this specification. As its main functions, the present position of the vehicle is displayed on a display screen 3a of the display monitor unit 3, for example, based on map information that is read from an internally reproduced recording medium 9 and present position information. Navigation information, such as information on routes and regional guides, can also be displayed.

The recording medium 9 can be composed of a disc, such as a CD-ROM (Compact Disk-Read Only Memory) or a DVD-ROM (Digital Video Disk/Digital Versatile Disk-Read Only Memory), and stores map information as mentioned above.

The display screen 3a of the display monitor unit 3 is composed of a liquid crystal display, for example, and is used to form a display based on image information that is outputted by the main navigation unit 2.

A reception unit 3b is provided to receive command information that is transmitted by the remote controller 8. The received information is transferred to the main navigation unit 2, as described later in this specification.

Though not shown in the drawing, the navigation apparatus of the present embodiment may be equipped with an audio output unit such as speakers so that audio can be outputted. When an audio output unit is provided, the main navigation unit 2 can output audio navigation information, which can be about certain points (such as junctions), road conditions, a spot at which the driver should turn left or right, a wrong route, etc., to the audio output unit. Having received this information, the audio output unit can give the user audible warnings and voice guidance.

The GPS antenna 5 is provided to receive radio waves from a GPS satellite, for example. The radio waves received by this GPS antenna 5 are demodulated to produce reception data that is inputted into the main navigation unit 2 and is used as described later to identify the present position of the car.

The traffic information reception antenna 7 is able to receive traffic information that is transferred using a predetermined traffic information communication system where information is transmitted using FM multiplexing, a light beacon, or an radio wave, beacon, for example. The traffic information received in this way may inform the user about traffic congestion and the availability of parking spaces, for example. Based on this traffic information, the main navigation unit 2 can display the current state of roads and, based on how congested the roads are, an indication of the time to destination and guidance to a car park with available spaces.

The autonomous navigation unit 6 detects travel information, such as the speed of the vehicle and the direction in which the vehicle is moving. In the example illustrated in FIG. 2, the autonomous navigation unit 6 includes a car speed sensor 6a, which detects speed pulses that change depending on the running speed of the vehicle, and a gyro 6b, which detects the direction in which the vehicle is moving. The travel information detected by the autonomous navigation unit 6 is also outputted to the main navigation unit 2 and is used to measure the present position of the vehicle.

In particular, the autonomous navigation unit 6 is used to measure the present position of the vehicle when radio waves sent via satellite communication cannot be received by the GPS antenna 5, such as when the vehicle enters a tunnel or is driving on an underground road.

The remote controller 8 is used by the user to operate the navigation system 1 of the present embodiment. The remote controller 8 includes a variety of operation keys, a signal generating unit that generates commands signals based on operations of the operation keys, and an output unit that outputs the command signals as luminance-modulated infrared signals. The commands outputted in this way using infrared light are received by the reception unit 3b.

An emergency key 8a provided on the remote controller 8 can be used by passengers of the car on encountering some kind of danger, such as when there has been an accident or the passengers are experiencing trouble with someone. As one example, when a user presses the emergency key 8a, image and/or audio data that is recorded at that time may be transmitted by the navigation system 1.

It should be noted that the main navigation unit 2 may be operated using other means, such as a remote controller that uses radio waves, a remote controller that is connected to the main navigation unit 2 by a cable, or an operation unit that is provided on the case of the main navigation unit 2 or the display monitor unit 3.

The communication terminal apparatus 50 is a mobile communication terminal that connects to the Internet via the wireless telephone communication network 300 that is shown in FIG. 1. By connecting to the main navigation unit 2 as shown in FIG. 2, the communication terminal apparatus 50 makes it possible for data to be wirelessly transmitted from the main navigation unit 2 and for data that has been received by the communication terminal apparatus 50 to be inputted into the main navigation unit 2 and then subjected to predetermined process. In other words, the connection between the communication terminal apparatus 50 and the main navigation unit 2 makes it possible for the navigation system 1 to access the Internet at the very least.

The security system unit 41 is provided to protect the vehicle and its passengers. In the illustrated example, the security system unit 41 includes an external camera 42, a microphone 43, a lock control unit 44, and a storage unit 45.

The external camera 42 can in fact be composed of a plurality of camera apparatuses. Out of convenience, these cameras are treated as one functional block in this specification. The plurality of camera apparatuses used as the external camera 42 are mounted at specific points inside and outside the vehicle and are oriented in predetermined directions according to their purposes. By doing so, it becomes possible to record images of both the inside of the vehicle and the immediate periphery of the vehicle.

For the same reason, a passenger compartment camera 3c and a front camera 3d are mounted on the display monitor unit 3 described earlier. The passenger compartment camera 3c is provided on the same side as the display screen 3a, while the front camera 3d is mounted so as to record images from the rear of the display monitor unit 3.

As one example, the display monitor unit 3 may be provided on the inside of the vehicle near the windscreen at a position that does not restrict the driver's field of view. By providing the display monitor unit 3 in this kind of position, it becomes possible for the passenger compartment camera 3c to record images of the inside of the vehicle and for the front camera 3d to record images of the area in front of the vehicle. When this kind of passenger compartment camera 3c and front camera 3d are used alongside the external camera 42, the external camera 42 only needs to be composed of camera apparatuses that record images of the areas behind the vehicle and to the left and right of the vehicle.

It should be noted that since these camera apparatuses input recorded image signals into the main navigation unit 2 and that these signals are recorded, as described later in this specification, as video data in the storage unit 45, CCDs (Charge Coupled Devices) or similar may be used as the image pickup device of the camera apparatuses.

The microphone 43 is provided to record audio data from outside the vehicle. The audio recorded in this way is inputted into the main navigation unit 2 where it is recorded in the storage unit 45, as described later in this specification.

The lock control unit 44 is mounted so as to allow control over the opening and closing of the door locks provided in the vehicle. The lock control unit 44 is also able to output lock information showing whether the vehicle is currently locked to the main navigation unit 2. This lock information is based on the state of the control mechanism that opens and closes the locks.

The storage unit 45 is composed of a storage device that can store a relatively large amount of data, for example. There are no particular restrictions on the media that may be used as the storage unit 45, so that a hard disk drive may be used, as may another kind of disc medium or non-volatile memory device. In the present embodiment, video data outputted by the various camera apparatuses mentioned above and the audio data outputted by the microphone 43 are recorded in the storage unit 45 as evidence that can be used to reproduce the state of the inside of the vehicle and the periphery of the vehicle at a given time.

1-3. Internal Construction of a Main Navigation Unit

Figure 3:
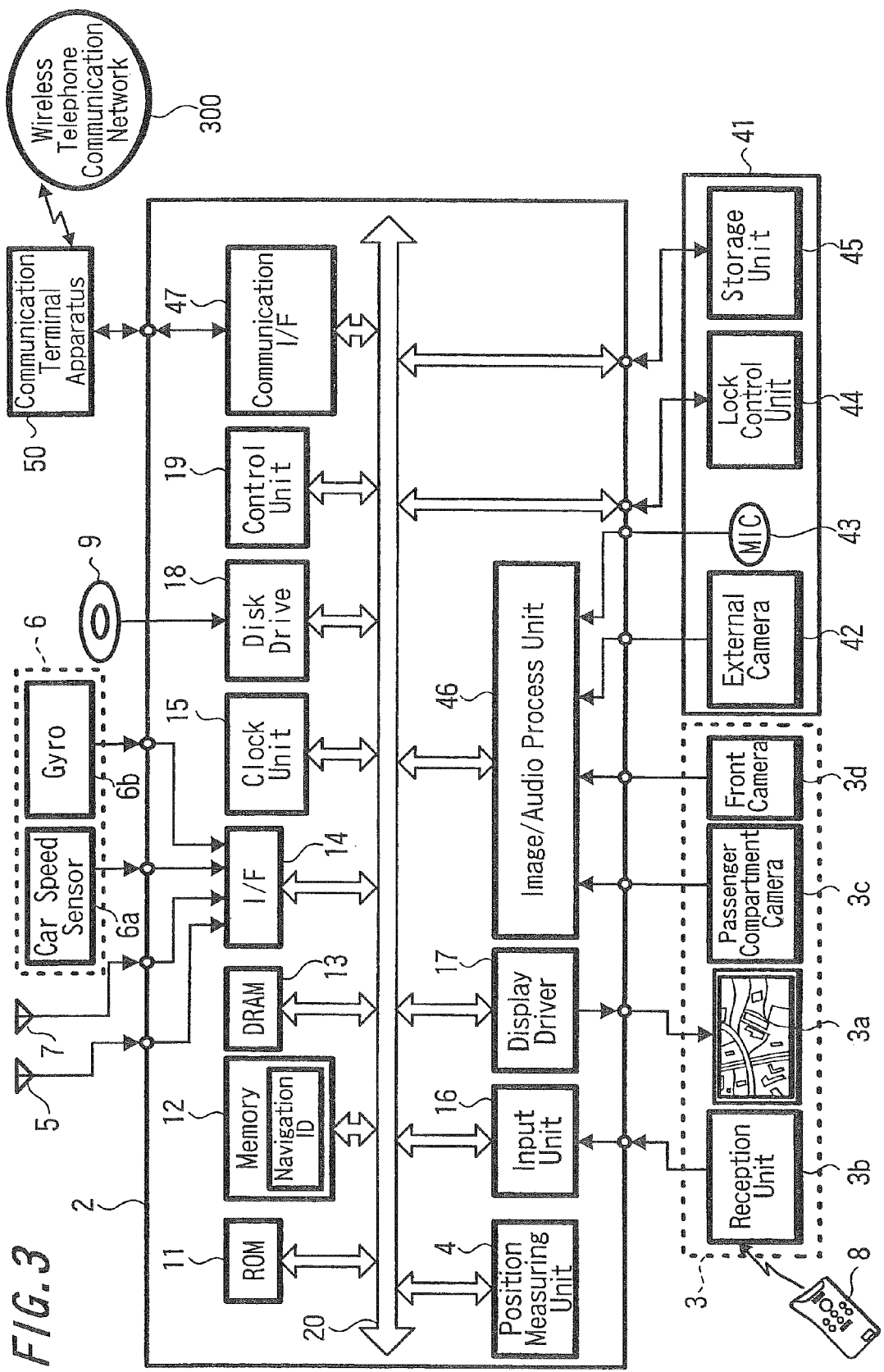
FIG. 3 is a block diagram showing one example of the internal construction of a navigation system according to the present embodiment.

FIG. 3 is a block diagram showing the internal construction of the main navigation unit 2.

In FIG. 3, a position measuring unit 4 is used to measure the present position of the vehicle. By executing a predetermined calculation process, for example, on GPS reception data that is sent from an interface 14 and the travel information for the vehicle, the position measuring unit 4 can obtain longitude and latitude information as position information showing the present position of the vehicle.

A ROM (Read Only Memory) 11 stores various programs that enable the navigation system 1 of the present embodiment to execute the predetermined process, as well as various kinds of factory preset data which as a basic rule cannot be rewritten.

A memory 12 is an EEPROM (Electrically Erasable Read Only Memory), such as a flash memory, that can retain its stored content even when it is not being supplied with power source. This memory is used to store backup data. This backup data may include various kinds of information, such as a destination that has been set by the user and a route corresponding to that destination.

However, when a rewritable memory, such as non-volatile memory or flash memory, is used as the ROM 11, it becomes possible to rewrite the programs and factory preset data as necessary, in a process usually referring to "updating". In the present embodiment, the ROM 11 is assumed to be a rewritable memory.

Also, in the present embodiment, a navigation ID that is uniquely assigned to the navigation system 1 is stored in the memory 12. This navigation ID can be assigned during the user registration process performed when the user purchases the navigation system 1, for example, with the navigation ID being written into the memory 12 before the navigation system 1 is handed over to the user. Alternatively, after the user has purchased the navigation system 1, the navigation system 1 may connect to the Internet, with the navigation ID being assigned by the service server 500 during an online user registration process. In this case, the navigation ID is transmitted to the navigation system 1 and written into the memory 12.

A DRAM (Dynamic Random Access Memory) 13 is used as a work area when a control unit 19 executes various processes. The DRAM 13 is also used when the process for generating navigation image information is performed, based on information such as the map information reproduced from the recording medium 9 by a disk drive 18.

The interface (I/F) 14 is provided to connect external apparatuses to the main navigation unit 2.

In the present case, reception data is inputted into the interface 14 from the GPS antenna 5. The data represented by the traffic information received by the traffic information reception antenna 7 is also inputted into the interface 14, as are the speed pulses detected by the autonomous navigation unit 6. Finally, the interface 14 also receives an input of the direction of travel information detected by the gyro 6b.

The reception data inputted from the GPS antenna 5 and the movement information (speed pulses and direction of movement information) inputted from the autonomous navigation unit 6 are transferred via a bus 20 to the position measuring unit 4. The position measuring unit 4 receives an input of the transferred information and calculates the present position of the vehicle.

The data represented by the traffic information received from the traffic information reception antenna 7 is written into the DRAM 13 according to control performed by the control unit 19, for example, to store the data. Also, as one example, by referring to the traffic information written into the DRAM 13, the control unit 19 can perform control over image process to have congestion, etc., shown by the traffic information reflected in the map information image data that is displayed by the display monitor unit 3.

A clock unit 15 measures the present time. This time information is used whenever time management is required within the navigation system 1.

The input unit 16 is connected to the reception unit 3b of the display monitor unit 3 and receives an input of command signals that have been sent by the remote controller 8 and received by the reception unit 3b. The input unit 16 converts the inputted command signals to a format that can be transferred on the bus 20 and then transfers the command signals via the bus 20 to the control unit 19. The control unit 19 properly executes the required control processes based on the inputted command signals.

A display driver 17 generates, under the control of the control unit 19, image information for display, and outputs this image information to the display screen 3a of the display monitor unit 3 via a terminal 34.

As one example, the display driver 17 generates an image signal showing the present position of the vehicle based on the map information that has been read from the recording medium 9 and the present position information for the vehicle that has been calculated by the position measuring unit 4. The display driver 17 outputs this image signal to the display monitor unit 3.

The disk drive 18 reproduces the recording medium 9. The disk drive 18 is provided with a reproduction function corresponding to the media format that is actually used by the recording medium 9. As one example, the disk drive 18 transfers map information that has been reproduced from the recording medium 9 to the DRAM 13 via the bus 20, with the map information thereafter being stored in the DRAM 13. The control unit 19 then refers to the DRAM 13 at the required timing and uses the map information stored therein as display data.

An image/audio process unit 46 performs the required digital signal process on the inputted recorded image signals and audio signals, finally producing recorded data that can be recorded in the storage unit 45. Here, the recorded image signals that are inputted into the image/audio process unit 46 are the signals sent from the passenger compartment camera 3c, the front camera 3d, and the external camera 42. The image/audio process unit 46 first converts these simultaneously inputted signals into digital data, and then performs a time division process so as to convert the various sets of recorded image data into compressed moving images data of a predetermined format.

The audio signal inputted into the image/audio process unit 46 is the signal outputted by the microphone 43. The image/audio process unit 46 also converts this audio signal to digital data, and may then convert the digital data to compressed audio data of a predetermined format.

The compressed moving images data and compressed audio data obtained by the above process is transferred via the bus 20 to the storage unit 45 and is written into the storage unit 45 in accordance with write control performed by the control unit 19.

When video data and audio data is being recorded in the storage unit 45, if the storage capacity of the storage unit 45 becomes totally used up, the oldest video data and audio data in the storage unit 45 are deleted by overwriting them with new data so that the most recent video data and audio data can be recorded. By doing so, a storage device with a relatively small storage capacity can be used as the storage unit 45. As one example, a storage device that can record around twenty or thirty minutes of data is deemed to be sufficient for recording evidence as intended in the present embodiment.

It should be noted that the image/audio process unit 46 may be provided with a decoding function for reproducing and outputting the video and audio data recorded in the storage unit 45, for example. By providing the image/audio process unit 46 with this kind of function, it becomes possible to have the video and audio data recorded in the storage unit 45 reproduced on the display monitor unit 3.

A communication interface 47 handles the transmission and reception of data between the communication terminal apparatus 50 and the main navigation unit 2. As one example, when data is being outputted from the communication terminal apparatus 50 to the main navigation unit 2, the communication interface 47 converts the data inputted from the communication terminal apparatus 50 into a format that can be internally processed by the main navigation unit 2 and outputs the converted data via the bus 20 to the appropriate functional circuit.

On the other hand, when data is being transferred from the main navigation unit 2 to the communication terminal apparatus 50, the communication interface 47 converts the data into a format that can be internally processed by the communication terminal apparatus 50 and outputs the converted data to the communication terminal apparatus 50.

In this case also, the control over the communication terminal apparatus 50 is executed by the control unit 19 of the main navigation unit 2. In other words, by connecting the communication terminal apparatus 50 and main navigation unit 2 and performing wireless communication between them, the navigation system 1 of the present embodiment can be provided with a function for communicating with the Internet.

The control unit 19 can be composed of a CPU (Central Process Unit) and executes appropriate control over the various circuits in the main navigation unit 2. As a result, the various operations of the present navigation system 1 that have been described above are realized.

1-4. Internal Construction of a Mobile Phone

Figure 4:
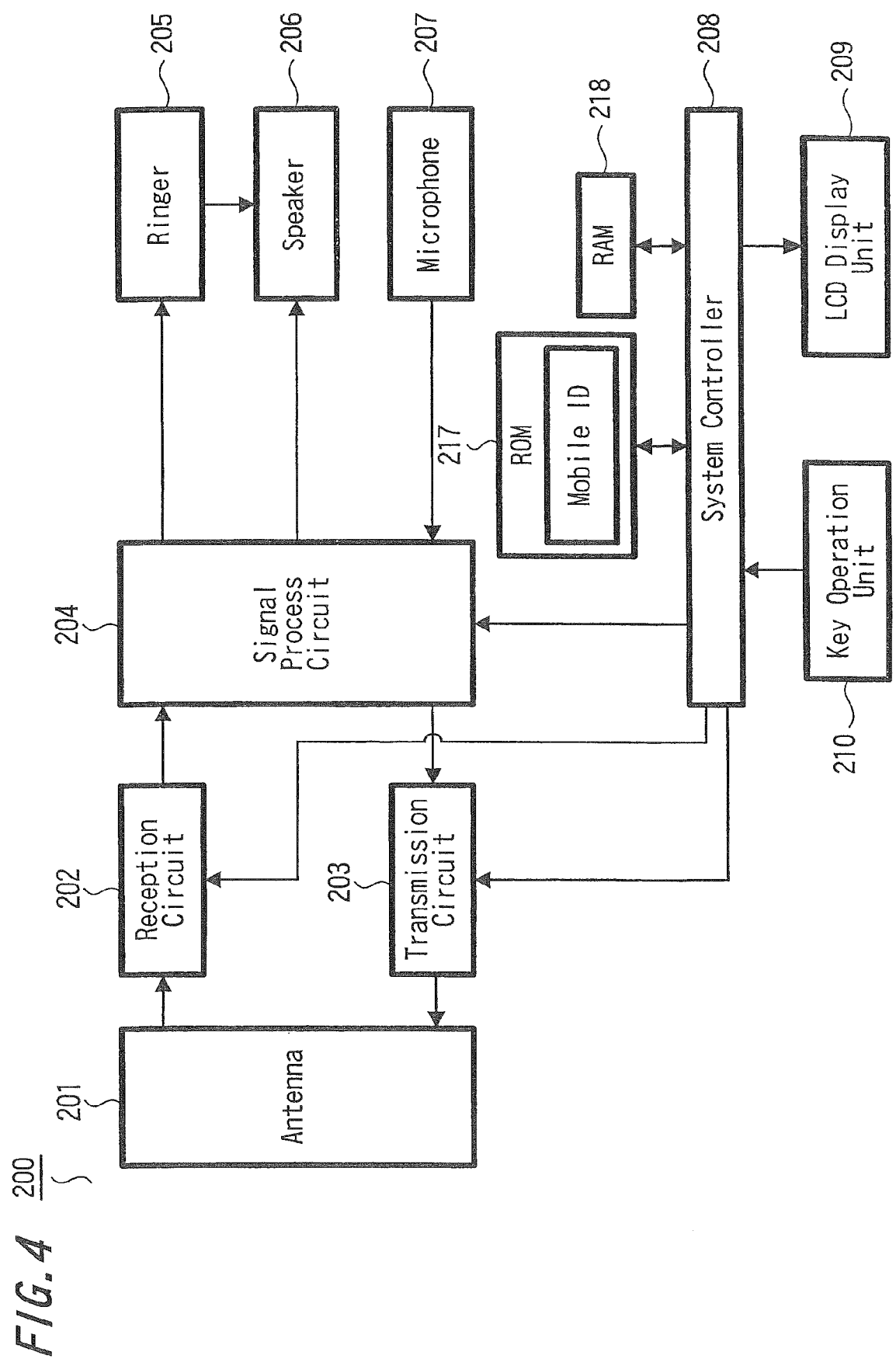
FIG. 4 is a block diagram showing one example of the internal construction of a mobile phone according to the present embodiment.

FIG. 4 is a block diagram showing a simplification of the internal construction of a mobile phone in the present embodiment.

Radio waves that are picked up by an antenna 201 are received and demodulated by a reception circuit 202, before being outputted to a signal process circuit 204. When the received waves represent audio data for the other party in a telephone conversation, the signal process circuit 204 demodulates the waves to produce audio signals that are outputted to a speaker 206, for example. When the received waves represent electronic mail or data from the Internet (or in other words, when data communication is being performed), the signal process circuit 204 demodulates the received waves to produce communication data. Based on control by a system controller 208, the demodulated communication data can be displayed by an LCD display unit 209.

When it is necessary during operation to output electronic sounds or a ring tone to inform the user of an incoming call, the system controller 208, for example, may control a ringer 205 so that the ringer 205 produces the required sound and has a corresponding audio signal outputted to the speaker 206.

Also during a telephone conversation, the user's voice is recorded by a microphone 207 and is inputted into the signal process circuit 204 as an audio signal. The signal process circuit 204 performs a predetermined encoding process on this audio signal and outputs it to a transmission circuit 203. The transmission circuit 203 outputs the signal inputted from the signal process circuit 204 to the antenna 201 so as to transmit the signal.

The system controller 208 performs various control processes so as to realize the various operations of the mobile phone.

The system controller 208 is equipped with a ROM 217 and a RAM 218. The ROM 217 is composed of a rewritable memory, such as flash memory or EEPROM, and stores programs that are to be executed by the system controller 208, as well as display data. Various other kinds of data that has been set or registered by a user, such as data for a user's phone book and sent and received electronic mail, may also be stored.

Also, in the present embodiment, a mobile ID that is uniquely assigned to the mobile phone 200 is stored in the ROM 217. In the case of a mobile phone, information showing the assigned telephone number may be used as the mobile ID.

The key operation unit 210 is composed of a plurality of predetermined button keys. The key operation unit 210 outputs an operation information signal based on a user operation of these button keys to the system controller 208. Based on this operation information signal, the system controller 208 executes a control procedure to realize the appropriate operation.

As shown in FIG. 4, the LCD display unit 209 is driven according to control by the system controller 208 so as to display information in accordance with the current operating state.

It should be noted that the internal construction of the communication terminal apparatus 50 provided in the present navigation system 1 is also based on the construction shown in FIG. 4. However, unlike a mobile phone, the communication terminal apparatus 50 does not need to allow the user to converse with other parties while on the move. Accordingly, the ringer 205, the speaker 206, the microphone 207, the LCD display unit 209, and the key operation unit 210 can be omitted from the circuit shown in FIG. 4. Instead, an interface function that allows data to be transferred to and from the communication interface 47 of the main navigation unit 2 can be provided.

1-5. Internal Construction of an Application Server

Figure 5:
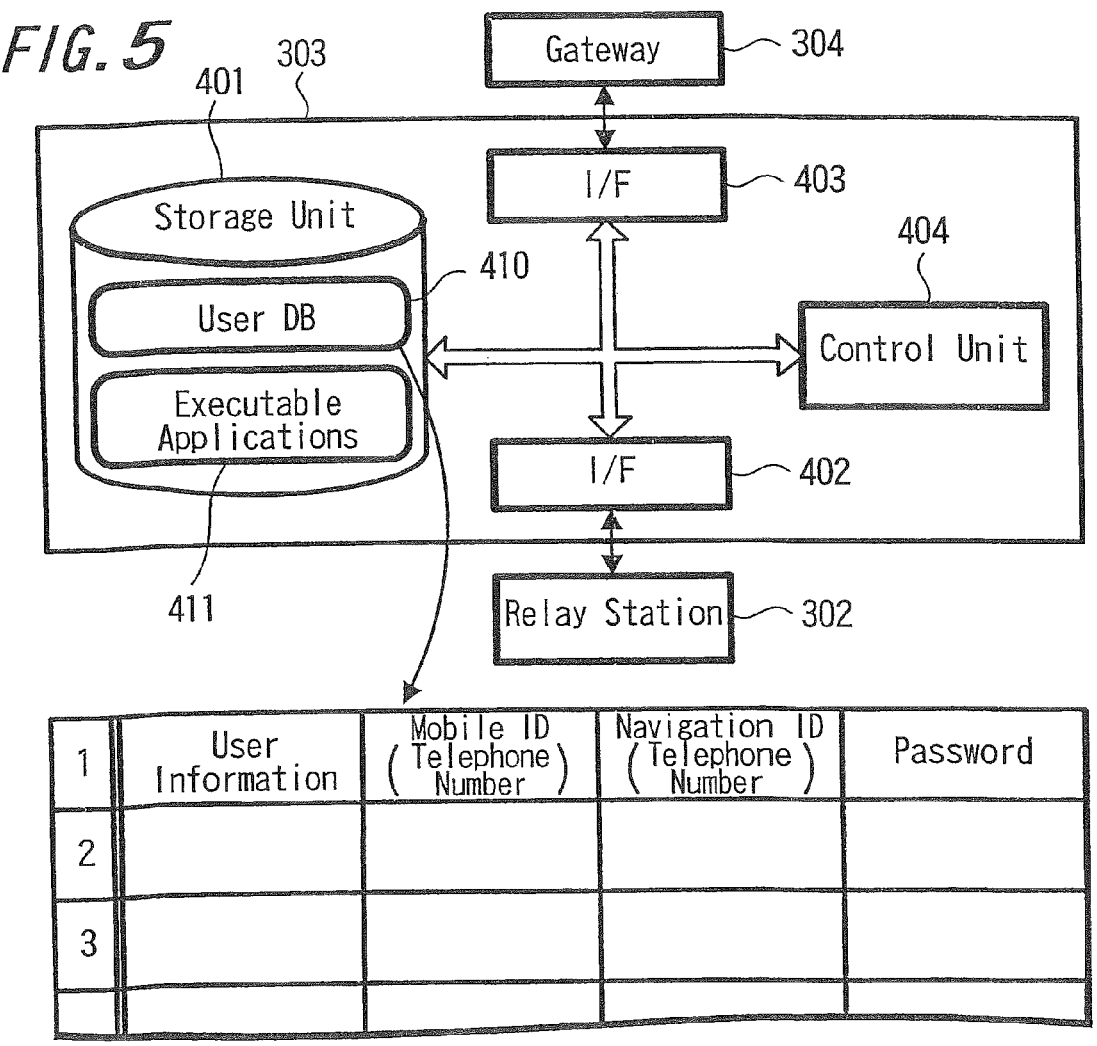
FIG. 5 is a block diagram showing one example of the internal construction of an application server that is provided on a wireless telephone communication network according to the present embodiment.

FIG. 5 is a simplified representation of the overall construction of the application server 303 that is provided on the wireless telephone communication network 300.

In the illustrated example, the application server 303 is composed of a storage unit 401, interfaces 402 and 403, and a control unit 404.

The storage unit 401 stores a variety of information that is required to realize the functions of the application server 303. In the present case, a user database 410 and executable applications 411 are representative examples of the data stored in the storage unit 401.

As shown in the example in the lower part of FIG. 5, the user database 410 may store user information, a mobile ID, a navigation ID, and a password for the user of the navigation system 1 and the mobile phone 200.

The user information is made up of a great variety of information relating to individual users that is required by a service. Representative examples of such information include the user's name, address and date of birth.

The mobile ID stores the same data as the mobile ID written in the mobile phone owned by the user. In the same way, the navigation ID stores the same data as the navigation ID assigned to the navigation system 1 owned by the user. It should be noted that as one example, the navigation ID may be thought of as the telephone number assigned to the communication terminal apparatus 50. If the navigation ID is a telephone number, this makes it easy for the application server 303 or service server 500 to access the wireless communication apparatus of the navigation system 1.

Also, when the mobile phone 200 accesses the navigation system 1 via the wireless telephone communication network 300, it can be verified that the mobile phone 200 demanding access is authorized by having the user input a password into the mobile phone 200. The same password is stored as the password in the user database 410.

However, as the content of the user database 410 shown in FIG. 5 information on each individual user may be prepared by obtaining required information at the opportunity described below, for example.

As one example, the navigation system 1 may be purchased via the Internet according to what is usually referred to as "online shopping". When making a purchase using online shopping, the user, for example, inputs the required personal information into an input form displayed in a browser screen.

In the case described in the present embodiment where the navigation system 1 is equipped with a communication terminal apparatus 50, when purchasing the navigation system 1, the user also signs up for a service provided by a communication company so as to be able to use the communication terminal apparatus 50. In the present embodiment, the application server 303 (or the service server 500) communicate with a retail server for an online shopping service to obtain the information mentioned above, before registering the information in the form of an entry in a database. In other words, if the user purchases the navigation system 1 via an online shopping service, the registration processes that are required when creating the user database 410 do not need to be performed.

Also, the navigation system 1 of the present embodiment can be sold via online shopping in a bundle with other intangible products, such as a service like car insurance. In this case, a discount can be offered on the prices of the insurance and the navigation system 1, or in the case of an installment credit contract, other special services may be offered, such as free or discounted commission for the installment credit. When a navigation system 1 is sold in a bundle with car insurance, the user information to be registered in the user database 410 can be obtained from the information inputted by the user into the input form used when signing up for the car insurance.

It should be noted that the mobile ID and password may be set by operating the mobile phone 200, for example, when the user signs up for a security service, with the data inputted by the user being transmitted to the application server 303 and stored therein. It should also be obvious that during a purchasing procedure in which the user buys the navigation system 1 via online shopping, a mobile phone that is capable of making use of the security service may be registered, with the mobile ID and password being notified by the application server at this point.

The executable applications 411 are composed of various application programs that correspond to operations to be executed by the application server 303. As examples, these may include an application program for managing the reception of electronic mail via the Internet, an application that connects to the Internet in accordance with access requests for web pages received from the mobile phone 200 or the navigation system 1, and an application program that searches the user database 410.

The interface 402 is provided to transfer information to and from the relay station 302. The interface 403 is provided to transfer information to and from the gateway 304 (the Internet).

The control unit 404 executes a variety of control processes in accordance with the content of the programs stored as the executable applications 411.

1-6. Internal Construction of a Service Server

Figure 6:
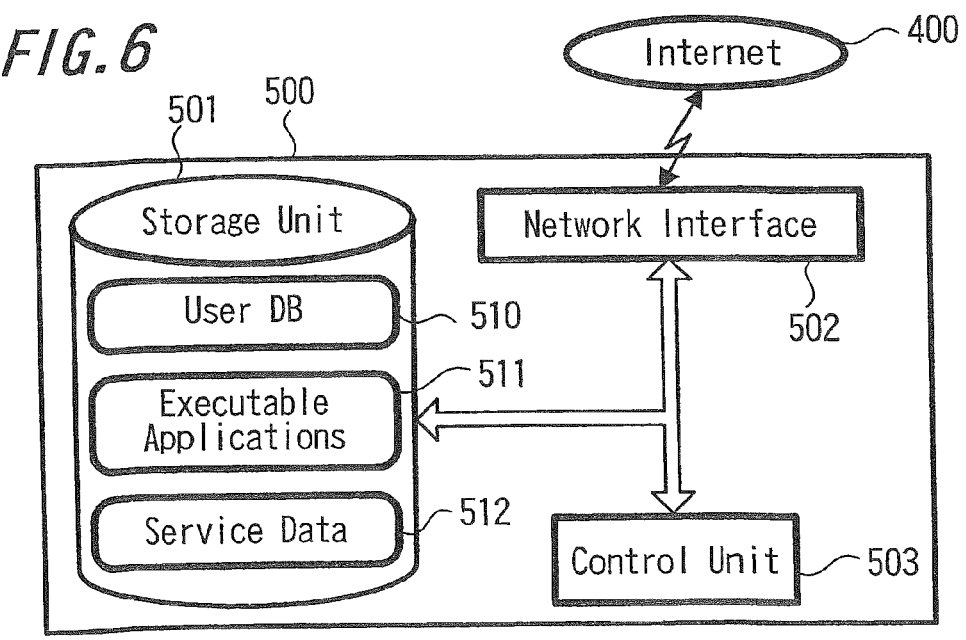
FIG. 6 is a block diagram showing one example of the internal construction of a service server according to the present embodiment.

FIG. 6 is a simplified representation of the internal construction of the service server 500.

In the illustrated example, the service server 500 is composed of a storage unit 501, a network interface 502, and a control unit 503.

The storage unit 501 stores various kinds of information that are required to realize the functions of a server that provides a variety of services. In the present embodiment, representative examples of the data stored in the storage unit 501 are a user database 510, executable applications 511, and service data 512.

As one example, the user database 510 can have the same content as the user database 410 that is shown in FIG. 5. By having the service server 500 communicate with the application server 303, it can be ensured that the content of the two databases is always the same. In other words, when one of the application server 303 and the service server 500 updates the content of the user database, such as when a new user signs up, this updating of the user database is reported to the other server which then rewrites its user database to prevent discrepancies from arising between the content of the two databases.

In the present example, the executable applications 511 in the service server 500 are composed of a variety of application programs corresponding to the various operations performed by the service server 500. The service data 512, meanwhile, is made up of various kinds of service data that can be transmitted to communication terminal apparatuses, such as the navigation system 1 or the mobile phone 200, to provide the user with services.

The network interface 502 is provided as an interface for connecting to the Internet.

The control unit 503 executes a variety of control processes in accordance with the content of programs stored as the executable applications 511.

2. Example of Service Provision by the Present System

In a service providing system that is constructed as described above, the navigation system 1 and mobile phone 200 can communicate with the service server 500 via communication networks like the wireless telephone communication network 300 and the Internet 400. In the present embodiment, communication performed within the system makes it possible to provide the following example services to users.

In the following example, it is assumed that an updated version has been produced for the map information recorded on the recording medium 9 used in a certain type of navigation system 1.

In this situation, the service server 500, for example, may search the user database 510 to find users who own a navigation system 1 that is capable of reproducing the updated medium. The service server 500 may then transmit (1) the navigation IDs of the communication terminal apparatuses 50 of the navigation systems 1 owned by these users and (2) content data recommending that users purchase the updated medium as the service data 512 to the application server 303 on the wireless telephone communication network 300. This content data may be a text message, such as "A new version of the map disc is available! Please update your system. You can get the disc by . . . ", which can be displayed on the display screen 3a of the display monitor unit 3.

On receiving the user IDs and content data, the application server 303 transmits the content data to every navigation system 1 that corresponds to one of the received user IDs.

The content data transmitted in this way is received by the communication terminal apparatus 50 of each navigation system 1 and is then transferred to the main navigation unit 2. Under the control of the control unit 19, the received content data is displayed on the display screen 3a of the display monitor unit 3. By doing so, the user can view the content of the displayed message and thereby be informed by the manufacturer of the availability of new map information.

It should be noted that when this kind of content data is received, it does not necessarily happen that the user is in a vehicle so that he may be able to view the content data displayed on a display screen 3a. For this reason, if content data is received by the communication terminal apparatus 50 when the car is not being driven or when the main power switch of the navigation system 1 is not on, the power switch may be automatically switched on and the received content data may be stored in the memory 12 or in the storage unit 45. After this, when the user next inserts the ignition key of the car and turns it, thereby switching on the power supply to the navigation system 1, the content data may be displayed on the display screen 3a of the display monitor unit 3.

Alternatively, while the navigation system 1 is in operation, the navigation system 1 may transmit information showing that the navigation system 1 is presently in operation along with its navigation ID to the service server 500 at predetermined intervals. In response to the transmission of this information, the service server 500 may transmit content data to the navigation system 1 with the navigation ID that has been received. When this arrangement is used, content data can be transmitted only when the navigation system 1 is in operation, making the transfer of information more efficient.

Also, as a further extension of the above arrangement, the navigation system 1 may transmit the present position of the vehicle as measured by the position measuring unit 4, for example, to the service server 500 at predetermined intervals. When, for example, the transmitted present position is located on a road that is newly supported by an updated medium, the service server 500 may judge that this is a ideal opportunity to recommend the updated medium and so send content data informing the user of the updated medium. By operating in this way, more advanced services can be provided to users.

Another conceivable example of a service would be for the manufacturer of a certain type of navigation system 1 to provide an update program that updates the software executed by the navigation system 1.

For ease of explanation, in the following example the service server 500 is assumed to store an update program as a single set of service data 512. At a favorable opportunity, this update program is transmitted to one or more navigation systems 1.

Each navigation system 1 uses the update program it has received to rewrite the programs and/or preset data stored in the ROM 11, for example. By doing so, the software used by the navigation system 1 can be updated through online data communication without the user having to go to the trouble of obtaining a medium including the update program. Since this updating of the software is performed automatically, this service is highly beneficial to users.

Also, by having the user operate the mobile phone 200, it becomes possible for the user to perform security-related control over the vehicle from a distance. A simplified description of this operation is given below.

As one example, the user may operate the mobile phone 200 to access the application server 303 on the wireless telephone communication network 300. The user accesses the application server 303 in this case since the server that allows the user to perform the security-related control over the vehicle is part of the application server 303. By performing a predetermined operation, the user can enquire whether the vehicle is locked. In response to this request, the security server in the application server 303 finds the navigation ID of the navigation system 1 owned by the same user as the mobile phone 200 that has made the access, and then sends a command to the navigation system 1 that has this navigation ID to enquire about the state of the locks of the vehicle.

On receiving this command, the navigation system 1 sends lock information, which is based on information received from the lock control unit 44 of the security system unit 41 and shows whether the vehicle is presently locked, to the application server 303. The application server 303 forwards this lock information to the mobile phone 200. Based on this lock information, the mobile phone 200 informs the user whether or not the vehicle is presently locked, such as by using the display of the mobile phone 200.

When the vehicle is not locked, for example, the user may then operate the mobile phone 200 so as to transmit instruction information that indicates that the car should be locked. On receiving this instruction information, the application server 303 transfers the instruction information to the navigation system 1 with the matching navigation ID. On receiving this instruction information, the navigation system 1 has the lock control unit 44 lock the vehicle.

In short, by using the mobile phone 200, a user can confirm whether his/her vehicle is locked. When the vehicle is not locked, the user can also have control performed so as to lock the vehicle.

On the other hand, when the locks have been opened by an intruder, for example, the navigation system 1 may report to the mobile phone 200 via the communication terminal apparatus 50 that the vehicle has been unlocked.

As a variation for the provision of an update program, another possible service could provide (i.e., transmit) an updated version of the map information to the navigation system 1, with the navigation system 1 using the received updated version so as to always display the latest version of the map information.

As mentioned earlier, the navigation system 1 uses map information that is recorded on the recording medium 9 so as to display the present position of the vehicle on a map. However, on the side of the navigation system 1, this map information is progressively updated by the manufacturer of the navigation system 1.

The service server 500 may store updated map information as one set of service data 512.

It should be noted that in this case, while there are no restrictions on the content and format of the update data, it is assumed here that the update data only includes the differences between the updated map information and the previous version, for example. If the map information is updated by simply adding new roads to the map, the update data is composed of difference information that shows where the new road should be displayed. When the update data is in the form of difference data in this way, the service server 500, for example, no longer needs to store information for the entire map including the new road as the update data stored as the service data 512. This means a corresponding reduction can be made in the storage capacity of the storage unit 501.

In this case, the user can be notified of the updating of the map information in the same way as when sending content data that advises the user to purchase the latest version of the medium on which the map information is recorded. If the received content data is displayed by the navigation system 1, the user can be informed that the map information has been updated and that the update data can be downloaded.

After this, when the user wishes to obtain the update data for the map information, the user may make a predetermined operation to instruct the navigation system 1 to download the map information. This operation can be achieved by displaying, as GUI on the display screen 3a, a download application such as XML, HTML, etc., included in the above-mentioned content data and having the user make the predetermined operation using the displayed GUI.

When the user has performed the operation described above, the navigation system 1 transfers a request for the update data along with its own navigation ID, according to control by the control unit 19, for example. This transmission data is sent from the communication terminal apparatus 50 to the wireless telephone communication network 300 and is received by the application server 303 on the wireless telephone communication network 300.

In response to this, the application server 303 transmits the received request for the update data and the navigation ID via the Internet 400 to the service server 500.

It should be noted that on receiving a request, the application server 303 should preferably perform an authentication process where the application server 303 verifies that the navigation system 1 that transmitted the request belongs to a user who is authorized to receive the requested service.

For this reason, in order to perform an authentication process with the present system configuration, the navigation system 1 may send a password together with the navigation ID. The application server 303 stores, as the data corresponding to each user in the user database 410, not just the password that is registered corresponding to the mobile phone 200, but also a password corresponding to the navigation system 1. On receiving a request, the application server 303 refers to the user database 410 and verifies the password corresponding to the navigation system 1 and the navigation ID that are received together with the request.

On receiving a request and a navigation ID, the service server 500 reads the update data for the map information that is stored in the storage unit 501 as the service data 512 corresponding to the request. The service server 500 then transmits the read update data and the received navigation ID via the Internet 400 to the application server 303 on the wireless telephone communication network 300. The application server 303 treats the received navigation ID (a telephone number) as the transmission destination where it transmits the received update data. As a result, the navigation system 1 that has requested the update data receives the update data.

Next, the navigation system 1 stores the update data it has received. Following this, the navigation system 1 uses the update data during navigation operations, such as when displaying the present position of the vehicle on the map or various kinds of guide information, so that the content of the update information can be reflected in the displayed information.

While the following service is not particularly beneficial to users, the following operation may be performed for users following the purchase of a navigation system 1.

When the user has purchased the navigation system 1 on installment credit, the service server 500 may store database showing the payments made by the user. When it becomes clear from the content of the above database that the user has fallen behind on the payments to a certain degree, the service server 500 may transmit control information along with a message that says, "Please make the next payment. This navigation system cannot be used until the receipt of the next payment has been confirmed". On receiving the control information and message, the navigation system 1 has the message with the above content displayed on the display screen 3a and has the operation of the navigation system 1 stopped thereafter.

As mentioned above, the navigation system 1 of the present embodiment may be purchased separately or as a bundle with car insurance. When the navigation system 1 is purchased in a bundle with car insurance, a service may offer a discount on the price of both items or on the interest charged when the items are purchased using installment credit. When the user purchases both items on credit and does not make the required payments, both the usage of the navigation system 1 and the insurance cover may be suspended, with the message warning the user that the car insurance is also being suspended.

This means that according to the present embodiment, communication between the navigation system 1 and the mobile phone 200 or the service server 500 makes it possible to provide a variety of services.

Navigation systems that can connect to the Internet are conventionally known, though in the case of such systems, each navigation system is merely one of countless terminal apparatuses on the Internet, so that it is not possible for a server, for example, to specify a particular navigation system and perform access to that navigation system.

Accordingly, when the user of the navigation system 1 wishes to receive a service that can be provided, the user first has to know the URL of the service server 500 and to have the navigation system 1 access the service server 500. In principle, the service server 500 has to receive accesses from an unspecified number of navigation systems 1, so that no distinctions can be made as necessary between the services provided to individual users. This means that only general purpose services can be provided, with the navigation system 1 having to access the service server 500 and select the desired services from the services on offer. In other words, if the user does not make an active effort to access the server, such as by making a specific operation, it is not possible to make full use of the available services.

On the other hand, with the present embodiment, the service server 500 and the application server 303 store the navigation IDs assigned to each navigation system 1 as a user database. By indicating a navigation ID, each server can access a specific navigation system 1. In other words, in the present embodiment, the server can access a navigation system 1 at an appropriate opportunity, for example, and so actively provide services with an appropriate content to the navigation system 1.

3. Example Procedure

The following describes the procedures that realize a number of services that have been selected from the example services described above.

Figure 7:
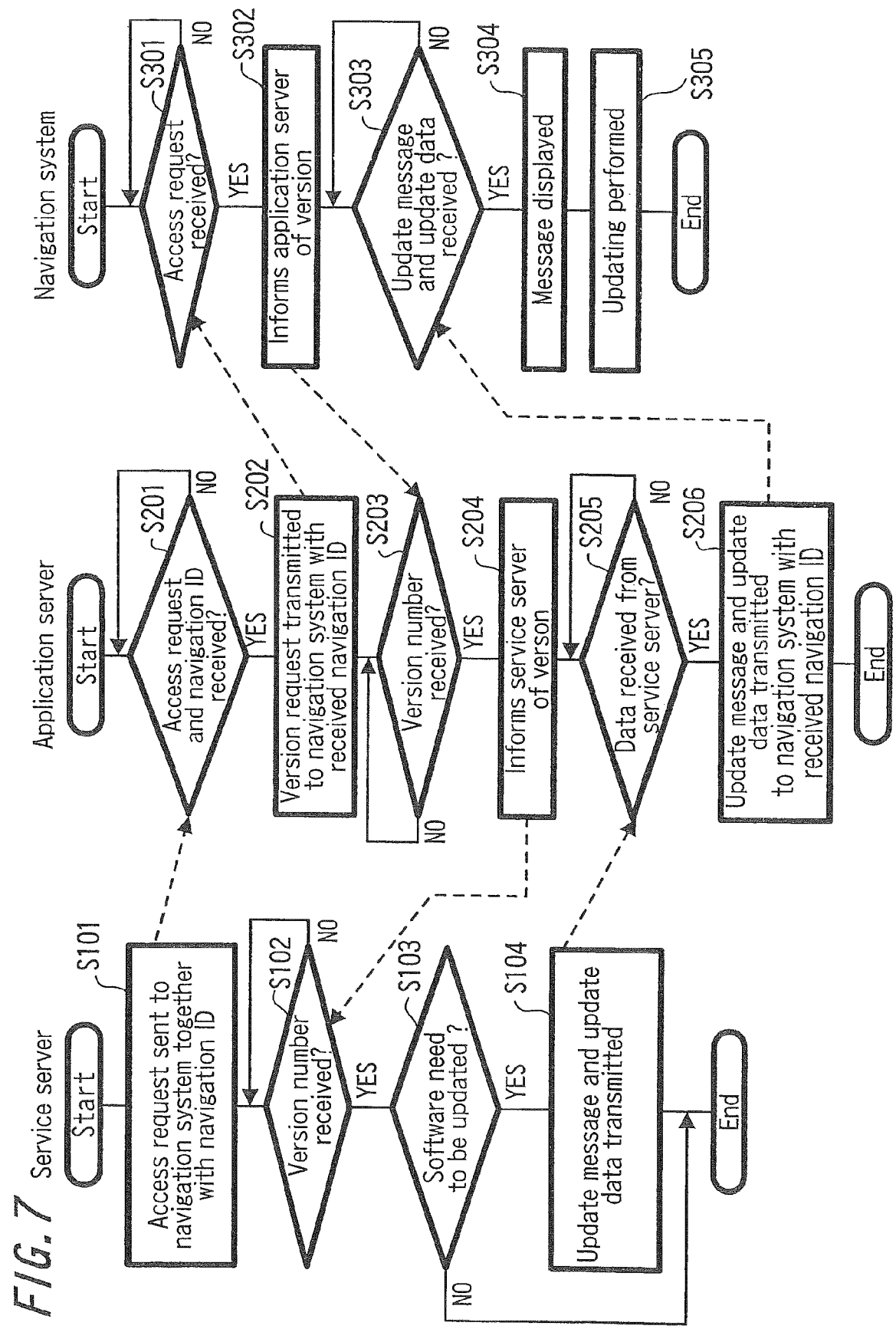
FIG. 7 is a flowchart showing the procedure used to provide a service that updates system software.

A procedure that realizes a service for updating the navigation system 1 is described first, with reference to the flowchart shown in FIG. 7. This service is provided by the service server 500. Note that in FIG. 7, the processes executed by the service server 500, the application server 303, and the navigation system 1 are shown in parallel. The process that takes place at the service server 500 is executed by the control unit 503, the process that takes place at the application server 303 is executed by the control unit 404, and the process that takes place at the navigation system 1 is executed by the control unit 19.

As one example, assume that the manufacturer has indicated to the service server 500 that the system software running in the navigation systems 1 should be updated. In this case, the control unit 503 of the service server 500 executes an access request for specified navigation systems 1 as the process in step S101. When doing so, the service server 500 transmits the navigation IDs of the navigation systems 1 to be accessed along with the access request. As one example, the navigation ID can be obtained by searching the user database 510 for information of the user who owns the navigation system 1 that needs to be updated and reading the navigation ID that is made to correspond with the user information that is found.

The access request mentioned above is transmitted to the application server 303 from the Internet 400 via the gateway 304. The application server 303 receives the access request in step S201 and then proceeds to step S202.

In step S202, the application server 303 transmits a version request, which enquires about the present version of the system software, to the navigation systems 1 with the received navigation IDs. At this juncture, as one example, designating the telephone number used as the navigation ID as a transmission destination, the application server 303 transmits the data on the version request via the relay station 302 and the base station 301.

The communication terminal apparatus 50 of a navigation system 1 that has a specified navigation ID receives a version request that has been transmitted as described above and transfers the version request to the control unit 19 in the main navigation unit 2. By doing so, the reception of a version request is discriminated by the control unit 19 as the process in step S301.

On receiving the version request, the control unit 19 notifies the present version by executing the process in step S302. In other words, on identifying the present version of the system software, the control unit 19 transmits, as a response, the identified version number from the communication terminal apparatus 50 to the application server 303. It should be noted that the navigation ID of this navigation system 1 is included in this response.

On receiving a response as the process in step S203, the application server 303 proceeds to step S204 where the application server 303 informs the service server 500 of the version. In other words, the application server 303 extracts the version number and navigation ID from the response it has received and transmits this information to the service server 500.

On receiving the notification of the version number from the application server 303, in step S103 the service server 500 judges whether the system software needs to be updated, based on the version number it has received. As one example, when the received version number is equal to or higher than the version number of the update data, the service server 500 obtains a negative result showing that the software does not need to be updated. However, when the received version number is lower than the version number of the update data, the service server 500 obtains a positive result showing that the software needs to be updated.

When a negative judgement result is obtained, the service server 500 does not perform further communication with (i.e., access) the navigation system 1 with the received navigation ID. However, when a positive judgement result is obtained, the service server 500 transmits an update message, update data, and a navigation ID to the application server 303 by performing the process in step S104. The update message and update data are obtained by reading them from the storage unit 501 of the service server 500 where they are stored as service data 512.

In step S205, the application server 303 receives the update message, update data, and navigation ID. After this, the application server 303 executes step S206 and so transmits the update message and update data to the navigation system 1 that has the received navigation ID.

In the navigation system 1, the update message and update data are received by the communication terminal apparatus 50 and transferred to the control unit 19 of the main navigation unit 2. As a result, the control unit 19 can recognize that an update message and update data have been received, as shown by step S303, and can then proceed to step S304.

In step S304, display image data is generated based on the content of the received update message. One example of this display image data is a message such as "A new version of the car navigation software has been released. This new version is being downloaded to update your system." In this way, the user can be informed that an update operation is being performed to update the system software to the new version. It should be noted that the content of the displayed message may be included in the content of the received update message.

After this, the control unit 19 of the main navigation unit 2 executes step S305 where it uses the update data to rewrite the required system data, such as the executable programs or present data written in the ROM 11, so as to update the system.

Next, the following describes the case where the user uses the mobile phone 200 to enquire whether the user's vehicle is locked and, when the vehicle is not locked, uses the mobile phone 200 once again to perform an operation that has control performed to lock the vehicle. The procedure performed in this case is explained using FIGS. 8 and 9.

In these drawings, the processes executed by the mobile phone 200, the application server 303, and the navigation system 1 are shown in parallel. The process that takes place by the mobile phone 200 is executed by the system controller 208, the process that takes place at the application server 303 is executed by the control unit 404, and the process that takes place at the navigation system 1 is executed by the control unit 19.

Figure 8:
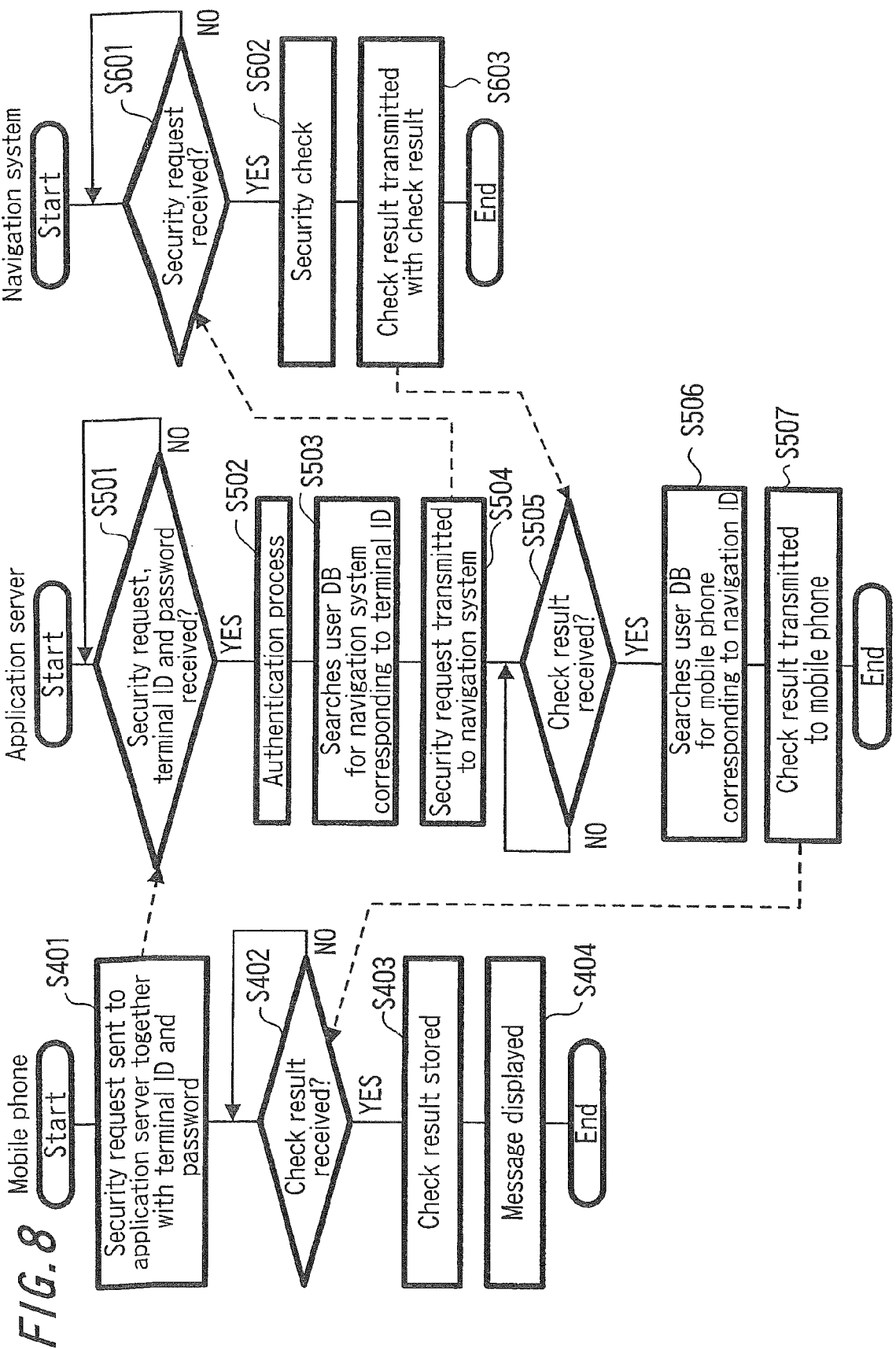
FIG. 8 is a flowchart showing the procedure used to provide a service that performs a security check on a vehicle based on a request from a mobile phone.

First, the procedure by which the mobile phone 200 asks the vehicle whether the vehicle is locked is explained, as shown in FIG. 8.

One example of the operation that the user makes using the mobile phone 200 is shown as step S401, which shows that a process for transmitting a security request along with the terminal ID is performed. This process can begin with the mobile phone 200 performing a communication process to access a server of a security system that is operated as part of the application server 303. After this, the user requests the server to make a security enquiry for the user's vehicle. At this point, to prevent such requests from being illegally made by other persons, the system has the user input a password that has been registered in advance.

The application server 303 (i.e., the server of the security system) receives the security request, the terminal ID and the password in step S501. In step S502, the application server 303 first refers to the user database 410 and looks up the password and terminal ID to verify that the user is authorized. In other words, the application server 303 confirms that the user who transmitted the security request, the terminal ID and the password is an authorized user. Note that when the user is not verified as an authorized user, the subsequent process is not performed.

When the user has been successfully verified, the application server 303 proceeds to step S503 where it searches the user database 410 to find the navigation ID that is associated with the verified terminal ID and password. Next, in step S504, the application server 303 transmits a security request to the navigation system 1 that has the navigation ID (telephone number) obtained from the user database 410.

The communication terminal apparatus 50 of the navigation system 1 receives the security request and transfers it to the control unit 19 of the main navigation unit 2. As shown in step S601, the control unit 19 recognizes that a security request has been received and proceeds to step S602.

In step S602, the control unit 19 executes a security check in a predetermined manner. In other words, the control unit 19 obtains data with a predetermined content that shows the present state that is monitored by the security system unit 41. This present state is assumed to include at least information that shows whether the vehicle is presently locked. In the process in step S603, the control unit 19 transmits data showing the result of the security check together with the navigation ID of the present navigation system 1 to the application server 303.

The application server 303 receives the response that is composed of the navigation ID and the result data for the security check as step S505, and then proceeds to step S506.

In step S506, the application server 303 refers to the user database 410 and finds the mobile ID corresponding to the received navigation ID. In step S507, the application server 303 sends the result data for the security check to the mobile phone 200 that has the mobile ID (telephone number) found from the user database 410. It should be noted that at this point, the result data for the security check to be transmitted to the mobile phone 200 is converted to a format that enables the result to be outputted as a text display by the mobile phone 200. As one example, when the mobile phone 200 is capable of handling electronic mail sent via the Internet, the result data for the security check may be transmitted to an electronic mail address that is associated with the mobile ID.

The mobile phone 200 recognizes that result data for a security check has been received in step S402. In step S403, the mobile phone 200 may then store the received result data in the ROM 217, for example. After this, if the user performs a predetermined operation, for example, the result of the security check may be displayed to the user in step S404 as text or the like on the LCD display unit 209.

Figure 9:
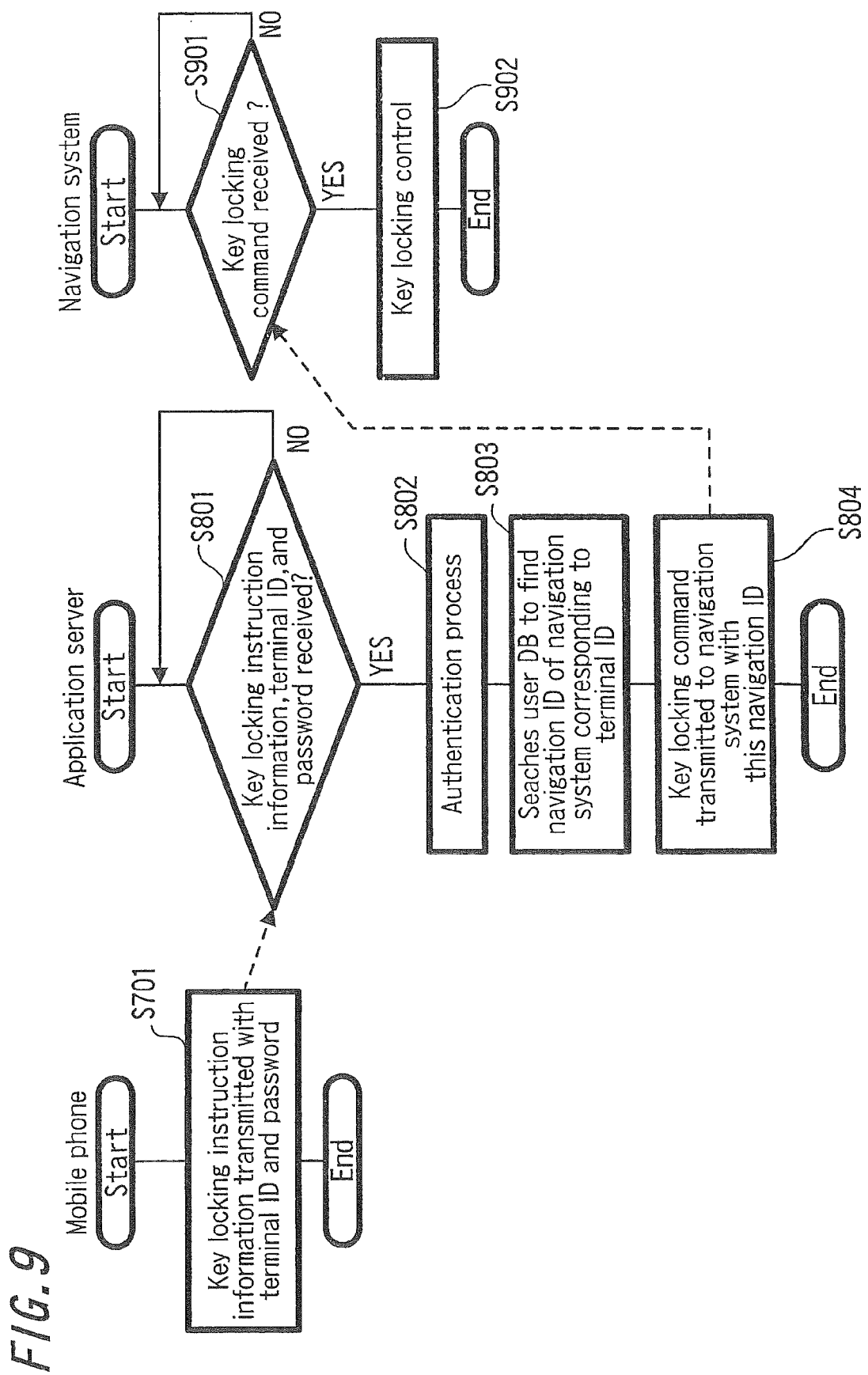
FIG. 9 is a flowchart showing the procedure used to provide a service where the locks of a vehicle can be controlled using a mobile phone.

As described earlier, on seeing from the result of the security check that is displayed on the LCD display unit 209, for example, that the vehicle is not locked, the user can perform a remote control operation using the mobile phone 200 to have the vehicle locked. The procedure used in this case is shown in FIG. 9.

In response to a predetermined operation made by the user, for example, in step S701 the mobile phone 200 uses its Internet connecting function to access the application server 303. After doing so, the mobile phone 200 transmits locking instruction information (which indicates that the car should be locked), the mobile ID, and the password to the application server 303.

In step S801, the application server 303 receives the locking instruction information, the mobile ID, and the password. After this, in step S802 the application server 303 performs an authentication process. This authentication process is the same as the authentication process performed in step S502 in FIG. 8. After this, if the authentication process shows that the user is authorized, the application server 303 proceeds to step S803.

In step S803, the application server 303 refers to the user database 410 to find the navigation ID that corresponds to the verified mobile ID. After doing so, in step S804 the application server 303 transmits a locking command to the navigation system 1 that has the obtained navigation ID.

In step S901, the navigation system 1 that has this navigation ID recognizes that a key locking command has been received. After this, in step S902 the control unit 19 responds to the received key locking command by performing control over the lock control unit 44 of the security system unit 41 so as to have the vehicle locked.

It should be noted that while it is not illustrated in FIG. 9, the control of the locks shown as step S902 should preferably be followed by the navigation system 1 transmitting security data to the mobile phone 200 to show that the locking of the vehicle has been completed. Operating in this way means that it can be confirmed that the locking operation has been properly executed in accordance with the user's instructions.

Figure 10:
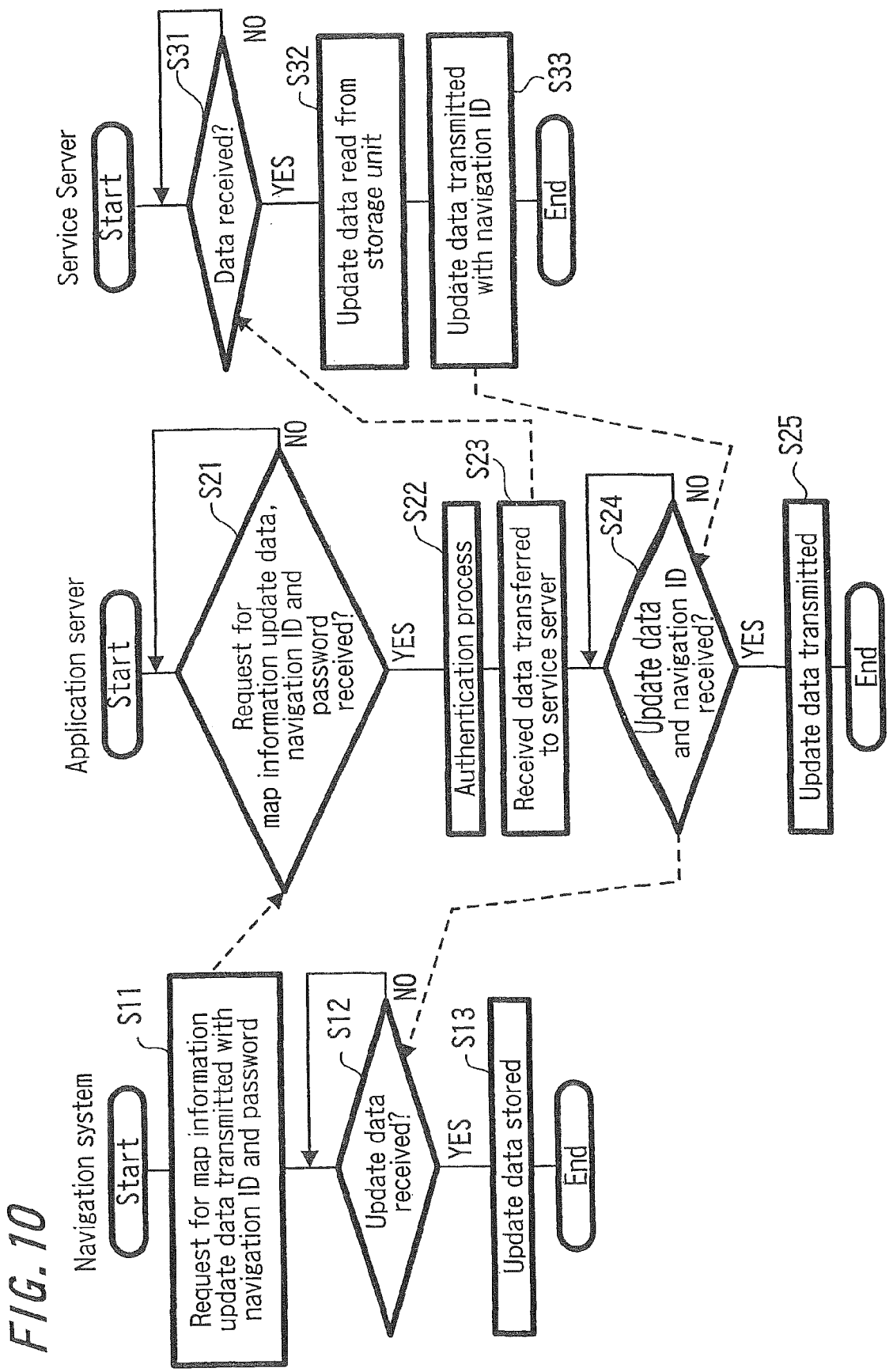
FIG. 10 is a flowchart showing the procedure used when providing a service that has update data on map information downloaded from a service server by a navigation system.

The following describes the procedure for a service that provides update data for the map information, with reference to FIG. 10.

In FIG. 10, the processes executed by the navigation system 1, the application server 303, and the service server 500 are shown in parallel. The process that takes place at the navigation system 1 is executed by the control unit 19, the process that takes place at the application server 303 is executed by the control unit 404, and the process that takes place at the service server 500 is executed by the control unit 503.

If, for example, the service is provided as explained earlier with the user operating the navigation system 1 so as to download update data for the map information, in step S11 a process is executed to transmit a request for the update data for the map information together with the navigation ID and password.

On receiving the request for the update data for the map information, the navigation ID, and the password in step S21, the application server 303 proceeds to step S22. In step S22, the application server 303 refers to the user database 410, executes an authentication process by comparing the received navigation ID and the password with the registered navigation ID and password, etc. In other words, the application server 303 confirms that the user who has sent the request for the update data is an authorized user. Note that when the user is not verified as an authorized user, the following process is not performed.

When the user has been successfully authenticated, the application server 303 proceeds to step S23 where it transmits the request and navigation ID that were received in step S21 to the service server 500.

In step S31, the service server 500 receives the request and navigation ID that have been transmitted from the application server 303. Next, in step S32, the service server 500 reads out a file that is the update data for the map information and is stored as the service data 512 in the storage unit 501.

It should be noted that as described above, the update data may be composed of the differences between the latest version and the previous version of the map information. Here, it is possible for the every available update data file to be read out, though it is also conceivable for the update data files to be treated as retail products, with the price of update data differing depending on a number of regions or the like that are specified by the user. In this latter case, the request includes information indicating the update data files to be downloaded, and the service server 500 only reads out the update data files that have been indicated.

After reading the update data files as described above, the service server 500 proceeds to step S33 where it transmits the read update data files together with the navigation ID, which was received with the request back in step S31, to the application server 303.

In step S24, the application server 303 receives the update data files and navigation ID that have been transmitted as described above from the service server 500.

Next, in step S25, the application server 303 transmits the update data files received in step S24 to the telephone number shown by the navigation ID that was also received in step S24. In other words, the application server 303 transfers the update data to the navigation system 1 that requested the download of the update data.

The update data file transmitted in this way is received by the navigation system 1 in step S12. Next, in step S13, the navigation system 1 stores the received update data files, such as by writing them in the DRAM 13, the memory 12, the storage unit 45, etc.

The following describes several examples of how the update data files that are stored in this way could conceivably be used.

As one example, as its basic operation the navigation system 1 may read the map information that is recorded on the recording medium 9 and display the present position of the vehicle on a map that is based on the read map information, as well as various kinds of other navigation information.

For this reason, when it is possible to overwrite the content of the recording medium 9 that stores the map information or to additionally record other data, the update data is written onto the recording medium 9. By doing so, when navigation is thereafter performed using map information that has read from the recording medium 9, the update data is also used, meaning that the navigation operation can reflect the content of the update data.

When the content of the recording medium 9 cannot be rewritten, the received update data can be stored in a memory 12 whose stored content is retained even when then power is switched off, or in the storage unit 45 or the like. When information is displayed using the map information, the update data that is stored in the memory 12 or storage unit 45 is read out and is combined with the map information that has been read from the recording medium 9 to form map information in which the update data is reflected. This map information is then used when navigation operations are performed.

Note that as described earlier, this kind of service that provides update data can conceivably be a free service or a fee-based service. If the service is fee-based, on receiving a download request that was transmitted from the navigation system 1, the server may perform a process that settles the payment in accordance with a payment method indicated by the user, for example.

4. Service Providing System

Second Embodiment 4-1. Overall Construction

The following describes a service providing system that is a second embodiment of the present invention.

Figure 11:
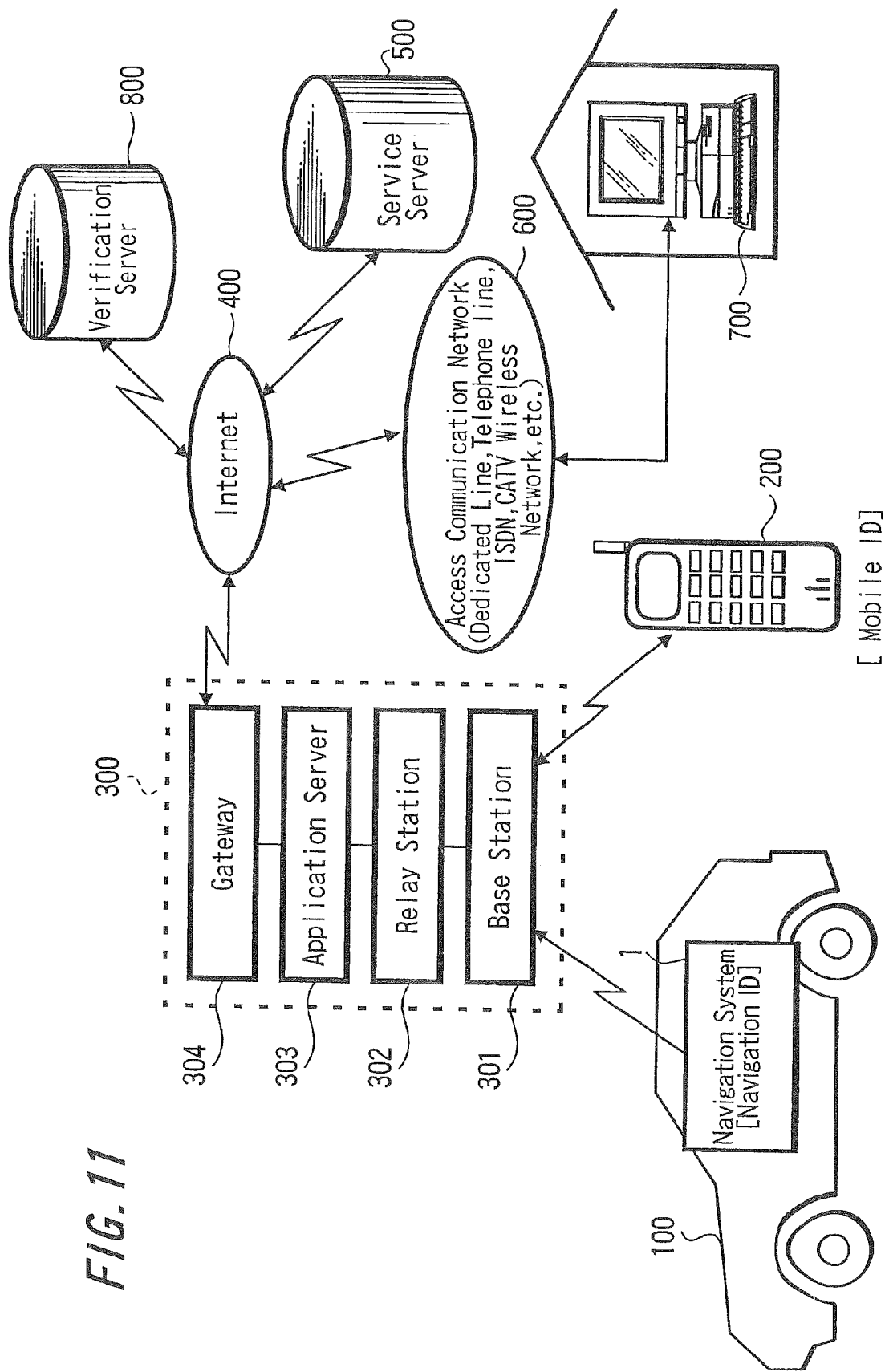
FIG. 11 is an explanatory diagram showing an example construction for a service providing system according to a second embodiment of the present invention.

FIG. 11 shows an example construction of a service providing system in accordance with this second embodiment.

As shown in FIG. 11, the service providing system of this second embodiment has almost the same construction as the system of the first embodiment, with a personal computer 700 and an authentication server 800 being additionally provided. As a result, the following explanation of the construction shown in FIG. 11 focuses on the differences with the first embodiment, such as these additional apparatuses. Parts that are the same as in the first embodiment have been given the same reference numerals as before and are not described again.

The personal computer 700 that is used in this case is assumed to be owned by the same user as the navigation system 1 and the mobile phone 200, and is set up indoors, such as in the home or at a company. This personal computer 700 connects to the Internet via an access communication network 600.

In the present embodiment, the personal computer 700 is set up indoors with the assumption that the personal computer 700 is not moved around on a daily basis. As a result, the connectors and other equipment for connecting to the access communication network 600 can be set up on the premise of them not being changed on a daily basis. Putting this another way, the environment in which the personal computer 700 is used in the present embodiment is such that the connectors for connecting to the access communication network 600 and the area from which the access communication network 600 is accessed do not change due to the personal computer 700 being moved, as may be the case with a mobile computer such as a notebook computer.

As mentioned above, the personal computer 700 connects to the Internet via the access communication network 600. When the personal computer 700 accesses the Internet by having a modem establish a dial connection with an ISP (Internet Service Provider) via a telephone line, the access communication network 600 is composed of an ordinary telephone line.

However, it should be obvious that the access communication network 600 used in the present embodiment is not restricted to an ordinary telephone line. As other examples, an ISDN (Integrated Services Digital Network) line, an XDSL line, such as an ADSL (Asymmetric Digital Subscriber Line) line where communication is performed with a high frequency bandwidth across telephone lines, a CATV (Community Antenna Television) network, or a wireless network may be used.

As described later in this specification, the authentication server 800 is provided to verify, when the personal computer 700 performs an access to the navigation system 1 mounted in the car 100 to find out the present position of the car 100, whether such access is authorized. By functioning in this way, the authentication server 800 prevents unauthorized operations, such as the obtaining of present position information from the car 100 by a personal computer that has not been properly registered in the system.

It should be noted that the internal construction of the authentication server 800 and its operation are described later in this specification.

4-2. Internal Construction of the Personal Computer

Figure 12:
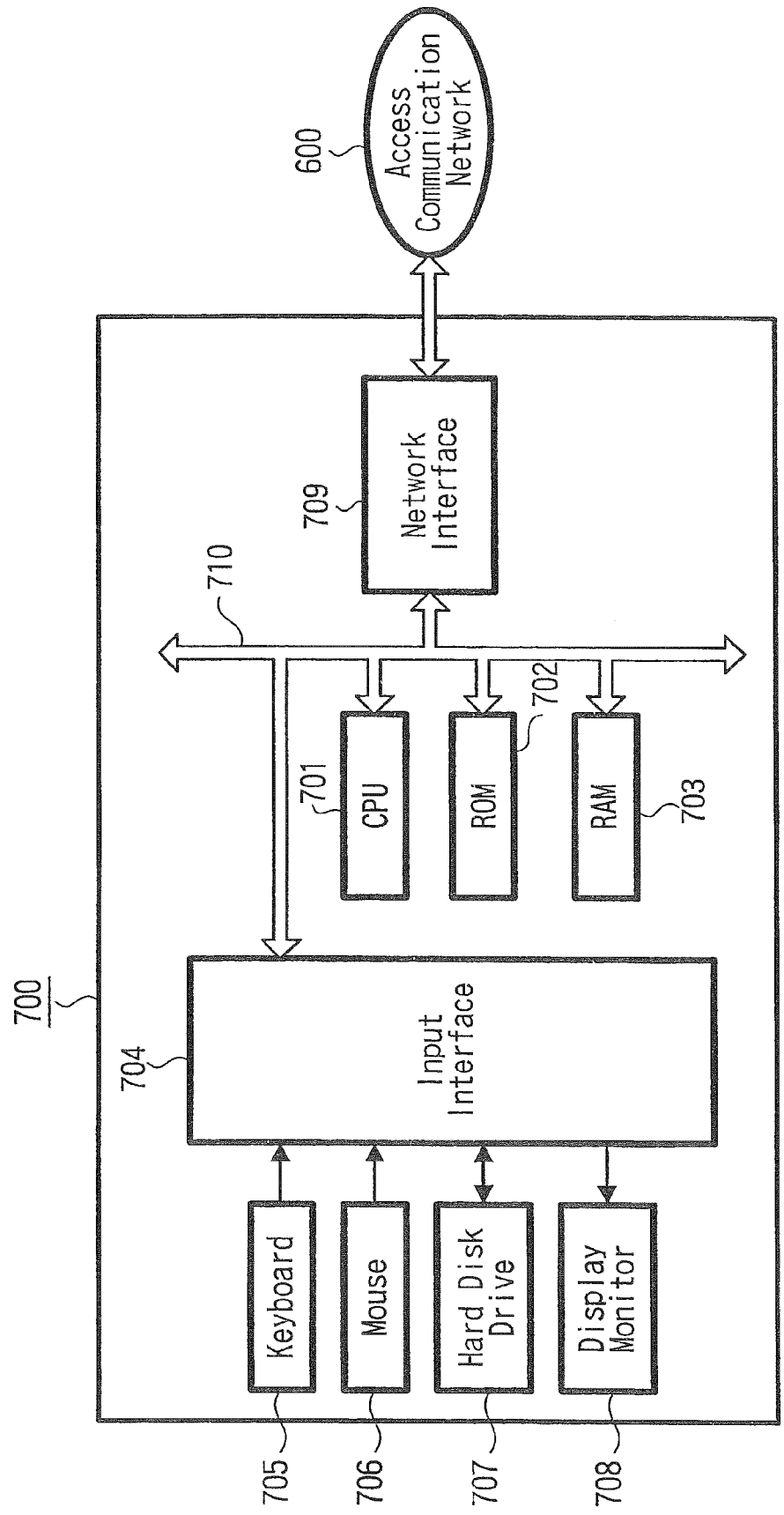
FIG. 12 is a block diagram showing one example of the internal construction of a personal computer.

FIG. 12 shows one example of the internal construction of the personal computer 700.

The personal computer 700 shown in FIG. 12 includes a network interface 709 for communicating via the Internet. This network interface 709 is in charge of communication between the access communication network 600 and the personal computer 700. By using the network interface 709, the personal computer 700 can communication with the Internet 400 via the access communication network 600.

A CPU (Central Process Unit) 701 executes various processes in accordance with a variety of application programs, which have been installed on a hard disk drive or the like, or with programs that have been stored in a ROM 702. In the present embodiment, a program for controlling the network interface 709 is stored in the ROM 702, for example. This program enables various kinds of data to be transmitted and received in accordance with the communication protocol TCP/IP that is used for communicating with the Internet. In other words, the personal computer 700 is set up (in terms of both hardware and software) so as to be able to transmit and receive data using the Internet.

A RAM 703 stores programs and data, etc., that are required when the CPU 701 executes various processes.

An input/output interface 704 is connected to a keyboard 705 and a mouse 706 and outputs operation signals received from the keyboard 705 and mouse 706 to the CPU 701. This input/output interface 704 is also connected to a hard disk drive 707 that uses hard disks as a storage medium. As a result, the CPU 701 can perform reads and writes for programs and data, etc., from or into the hard disks in the hard disk drive 707 via the input/output interface 704. In the present example, the input/output interface 704 is also connected to a display monitor 708 for displaying images.

An internal bus 710 can be composed of a local bus or PCI (Peripheral Component Interconnect) bus, for example, and internally connects the various functional circuits of the personal computer 700 together.

4-3. Internal Construction of the Authentication Server

Figure 13:
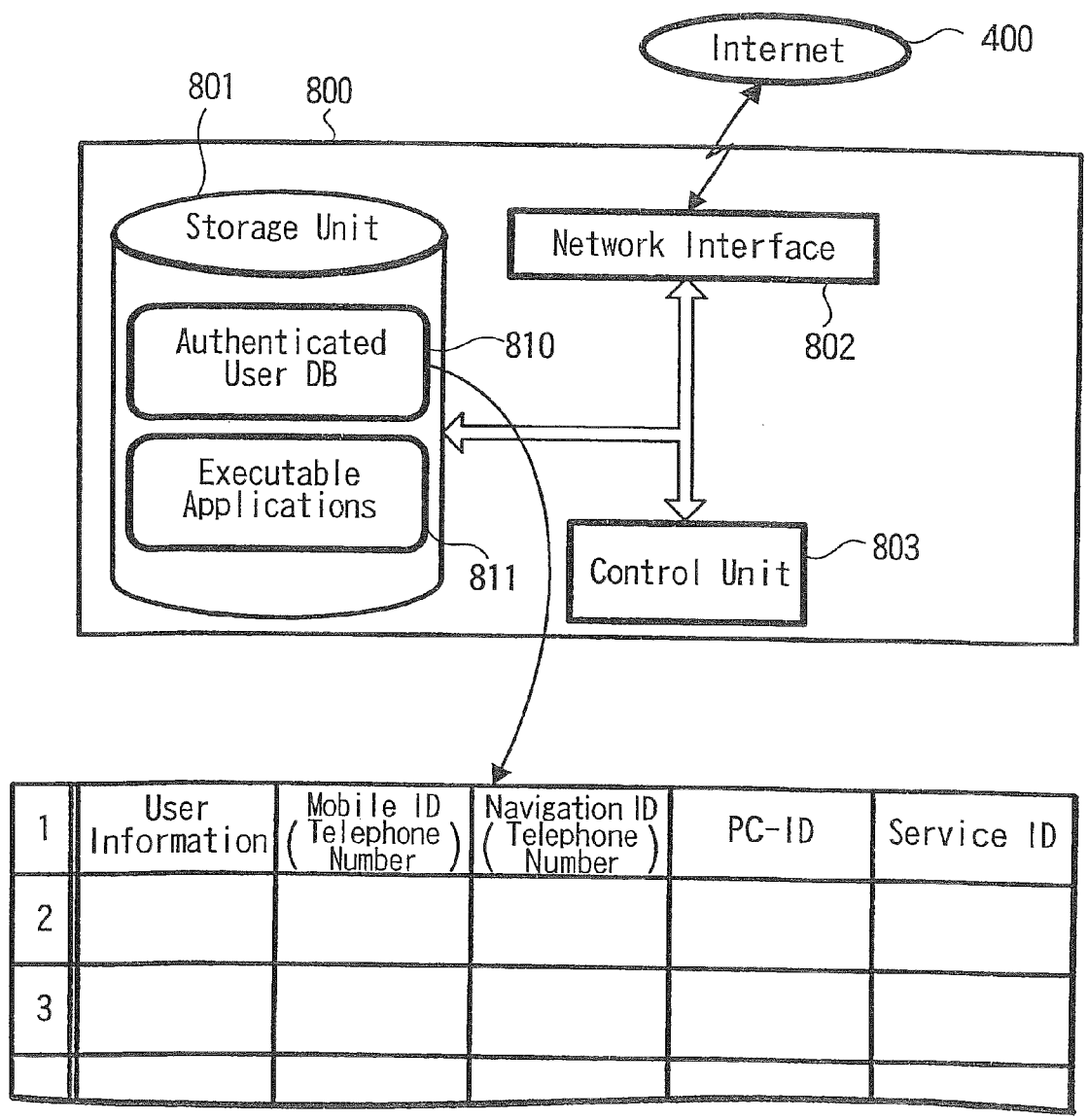
FIG. 13 is a block diagram showing one example of the internal construction of an authentication server in the present embodiment.

The following describes one example of the internal construction of the authentication server 800, with reference to FIG. 13.

As shown in FIG. 13, the authentication server 800 includes a storage unit 801, a network interface 802, and a control unit 803.

In the authentication server 800, the storage unit 801 stores the information that is required when executing the authentication process, etc., that is described later in this specification. In FIG. 13, an authenticated user database 810 and executable applications 811 are shown as the data stored in the storage unit 801.

As shown at the bottom of FIG. 13, for example, the authenticated user database 810 stores user information, a mobile ID, a navigation ID, a PC-ID, a content ID, and a PC password in association with each user.

The user information referred to here is information relating to a user that owns a set of a navigation system 1, a mobile phone 200, and a personal computer 700. As one example, in the system of the present embodiment, this user information can have the same content as the user information composing the user database 510 (or 410) stored in the service server 500 (or application server 303).

The mobile ID stores the same data as the mobile ID that is written in the mobile phone owned by the user in question. In the same way, the navigation ID stores the same data as the navigation ID that has been assigned to the navigation system 1 owned by the same user. This navigation ID may be a telephone number that has been assigned to the communication terminal apparatus 50. In other words, the mobile ID and navigation ID used here can store the same information as that stored in the database construction that was described with reference to FIG. 5.

The PC-ID is an ID number of identifying the personal computer 700 that is owned by a user who is specified using the user ID. In the present embodiment, the PC-ID has a special composition that is described later in this specification.

The service ID is an ID number that identifies a service to be processed by the authentication server 800.

When constructing this authenticated user database 810, various kinds of information have to be registered for each user. This operation is described later in this specification.

In the present example, the executable applications 811 are composed of various kinds of application programs corresponding to the various operations to be performed by the authentication server 800.

The network interface 802 is provided as an interface for connecting to the Internet 400.

The control unit 803 executes various control processes in accordance with the programs stored as the executable applications 811.

4-4. Example of Service Provision by the Present System

From the viewpoint of the user, the system construction shown in FIG. 11 has the following characteristic. In addition to the navigation system 1 and the mobile phone 200, the personal computer 700 is statically set up indoors as another device that the user can use to connect to the Internet 400 and make use of the provided services.

In this kind of system, a new service can be achieved whereby the navigation system 1 is able to transmit present position information showing the present position of the vehicle to the personal computer 700.

The following is a simplified explanation of the operation performed when using this service.

In this case, the user of the personal computer 700 wishes to know the present position of the car 100 in which the navigation system 1 owned by the user is mounted. In this case, the user launches an application on the personal computer 700, such as a web browser, and by performing a predetermined operation, accesses a web site for the service that provides users with present position information. This web site for the service that provides users with present position information is in the form of a web site that has been uploaded onto the authentication server 800. In other words, by accessing the web site for the service that provides users with present position information, the personal computer 700 accesses the authentication server 800.

After accessing the authentication server 800 in this way, the user transmits a request for present position information. Here, it is assumed that authentication information, which is to be used by the authentication server 800 during authentication, is transmitted along with the request for the present position information.

It should be noted that a description of this authentication information is given later in this specification.

The authentication information used during the authentication performed by the authentication server 800 includes the PC-ID that uniquely belongs to the personal computer 700 that transmitted the request. This PC-ID is not generated by the personal computer 700 and transmitted, but is generated within the access communication network 600 that is connected to the personal computer 700 (such as by a part of the access communication network 600 that functions as an application server) when the personal computer 700 accesses the authentication server 800. The generation of the PC-ID and its registration in the authenticated user database 810 are both described later in this specification.

As described above, the authentication server 800 refers to the authentication information that is transmitted together with the request for the present position information and to the authenticated user database 810 and performs an authentication process that determines whether the personal computer 700 that has transmitted the request has been properly registered. When the authentication result is that the personal computer 700 has been properly registered, the authentication server 800 transfers the request from the Internet 400 to the navigation system 1 owned by the user via the wireless telephone communication network 300.

It should be noted that when the authentication result shows that the personal computer 700 has not been properly registered, the authentication server 800 does not transfer the request to the navigation system 1.

On receiving this request, the navigation system 1 generates present position information showing the present position of the vehicle and transmits this from the wireless telephone communication network 300 to the authentication server 800 via the Internet 400. The authentication server 800 then transmits the received present position information to the personal computer 700. The personal computer 700 reproduces the received present position information using a web browser. As a result, information showing the present position of the vehicle is displayed on the display monitor 708 of the personal computer 700.

4-5 Structure of the Authenticated User Database

As can be understood from the operation of the authentication server 800 described above, when a user tries to make use of the above service, information relating to the user who wishes to use the service needs to be registered in the authenticated user database 810 in the authentication server 800.

This registration may be achieved in a variety of conceivable ways. As one example method, when a user wishes to make use of the service, the user may have the personal computer 700 access the authentication server 800 and perform an appropriate registration operation to register the required information.

In other words, the user operates the personal computer 700 and accesses a registration web page that is hosted by the authentication server 800, for example. This web page is designed so as to allow the user to input the various pieces of information for one user that are required to construct the authenticated user database 810 shown in FIG. 13. In more detail, the following user information is inputted: personal information such as the user's name and address; a "mobile ID" (telephone number) of the mobile phone 200 owned by the user; a "navigation ID" (telephone number) of the navigation system 1 owned by the same user; and a service content that the user wishes to use corresponding to a "service ID" (in the present case, the service that provides the present position information. The authentication server 800, for example, may be constructed so as to perform authentication during the provision of services aside from the service that provides the present position information, so that in this case, the service ID can be used to identify the service that has been requested by the user.

The service that provides present position information in the present embodiment is described as not being available to the mobile phone 200, so that the mobile ID does not have to be registered as part of the information in the authenticated user database 810. However, if authentication is performed by the authentication server 800 for services aside from the service that provides present position information, the mobile ID is required if these other services are realized using the mobile phone 200.

In FIG. 13, the PC-ID needs to be registered in addition to the "user information", the "mobile ID" (telephone number), the "navigation ID" (telephone number), and the "service ID".

As one example, this PC-ID can be generated by having the personal computer 700 generate a device ID composed of a manufacturer code, which identifies the appliance as a personal computer, and a serial number or the like. This device ID can be transmitted with the other information described above as the PC-ID. This manufacturer code and serial number can be stored in a ROM provided in the personal computer 700, for example, during the manufacturing process or at another stage. As a result, it is easy for the personal computer 700 to generate the device ID based on this information.

However, when the device ID is generated using information that is stored in the personal computer 700 in advance, such as the manufacturer code and serial number described above, there is the potential for a dishonest user to tamper with the information and impersonate another user.

In more detail, in the case of the service that provides present position information in the present embodiment, even though only one personal computer 700 is properly registered for each user, there is the potential that access will be performed to the authentication server 800 by another personal computer whose device ID has been rewritten using the device ID of a registered computer.

As one example, in the system configuration described above as the first embodiment, the navigation system 1 and the mobile phone 200 both connect to the Internet via the wireless telephone communication network 300. This wireless telephone communication network 300 is managed based on information such as telephone numbers, so that there is no risk of a dishonest user impersonating a registered user if the access is performed from a registered telephone number. However, in this second embodiment, the system configuration additionally includes a personal computer 700. This personal computer 700 does not perform access to the wireless telephone communication network 300, but instead accesses the Internet via the access communication network 600, which can be any kind of network, such as a telephone line. In this case, the aforementioned problem of dishonest third parties impersonating registered users arises, so that countermeasures against such activity need to be taken.

For this reason, a PC-ID is generated and registered in the authentication server 800 in the following way so as to stop unauthorized third parties from illegally using services by amending the device ID and impersonating a registered user. Note that three example countermeasures are described, with the selection of the countermeasure used depending on the type of communication network used as the access communication network 600.

Figure 14:
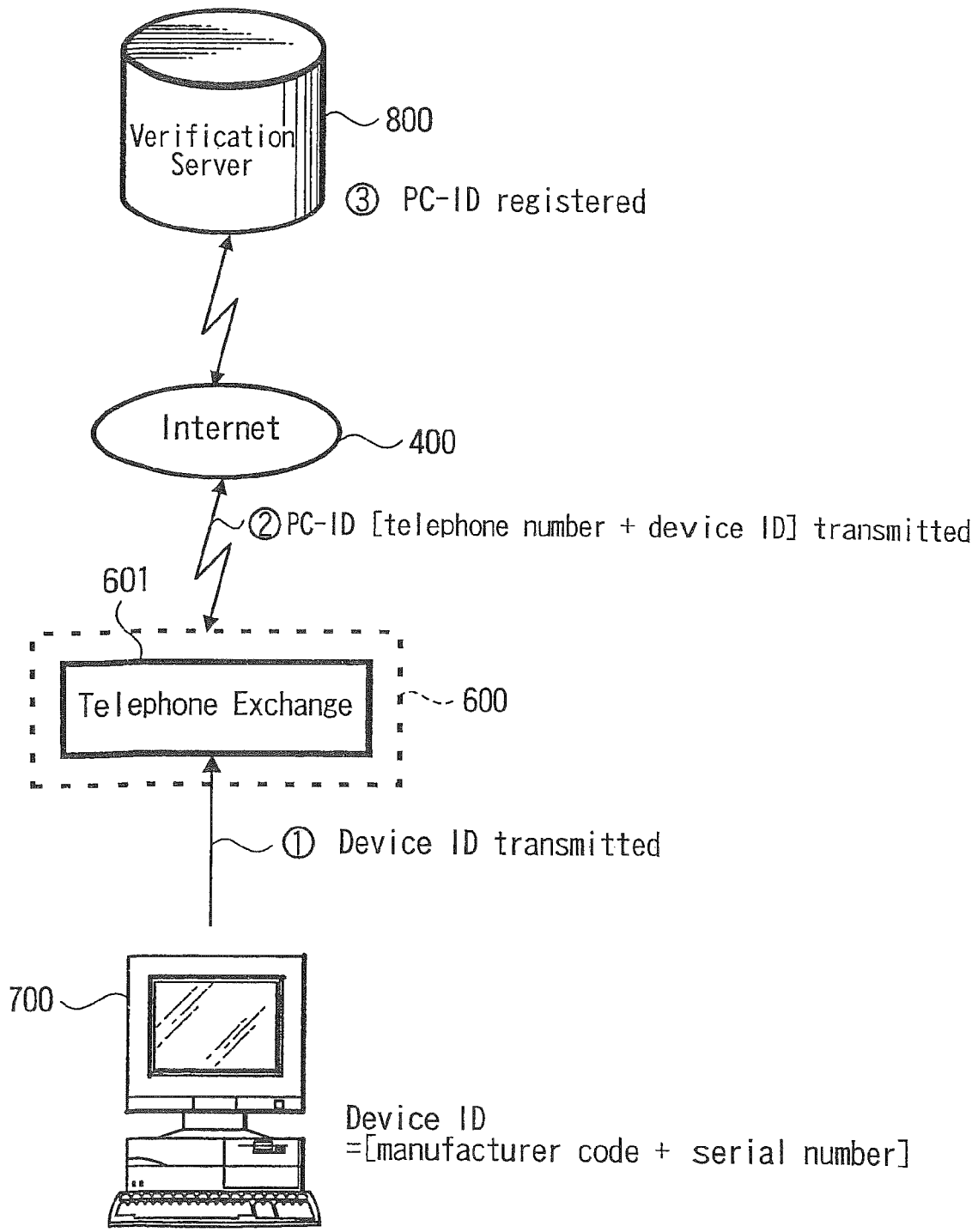
FIG. 14 is a conceptual diagram of a first example procedure for registering a PC-ID in the present embodiment.

FIG. 14 schematically shows a first example of the procedure for the registration of the PC-ID. In this first example, the access communication network 600 is a standard telephone line or an ISDN line.

When the access communication network 600 is a standard telephone line or an ISDN line, the personal computer 700 performs what is known as a dialup operation to connect to the Internet. In other words, though not illustrated, a modem, TA (Terminal Adapter), DSU (Digital Service Unit) or the like that is provided to the personal computer 700 dials a telephone exchange 601, which is provided on the standard telephone line or ISDN line used as the access communication network 600, to connect the personal computer 700.

At this point, it should be noted that the connection to the telephone exchange 601 is achieved by a dialup operation and that the telephone number assigned to the telephone line or ISDN line used for this dial up operation is uniquely assigned. This telephone number is managed by the telephone exchange 601 and so is information that cannot be amended by a user of the personal computer 700. In the present embodiment, this telephone number is used when generating the PC-ID. The following procedure can be used when generating and registering a PC-ID that is based on this telephone number.

This procedure (1) starts with the personal computer 700 transmitting the device ID to the authentication server 800. It should be noted that when this device ID is transmitted, other information such as the "user information", the "mobile ID" (telephone number), the "navigation ID" (telephone number), and the "service ID" described earlier, may also be transmitted. Also, as one example, the device ID may be generated from the manufacturer code and serial number as described earlier.

As process (2), the telephone exchange 601 on the access communication network 600 first generates the PC-ID based on the device ID received from the personal computer 700 and information on the telephone number of the telephone line (or ISDN line) used by the present dial up connection. Here, a great number of methods can be used to generate the PC-ID from the device ID and the telephone number information, so that there are no particular restrictions on the method used. As one example, the simplest method would be to link the data values provided as the device ID and the telephone number information to form the PC-ID. Alternatively, a calculation may be performed on the data values provided as the device ID and the telephone number information using a predetermined function, so as to produce a data value with a predetermined bit length. The resulting data value is then used as the PC-ID.

Since a PC-ID that is generated in this way is based on the device ID and telephone number, each PC-ID is unique information for a personal computer 700. Also, since the PC-ID is generated from a telephone number, even if a user can tamper with the device ID, the user will not be able to tamper with the telephone number, so that the user will not be able to produce the same PC-ID. The telephone number is managed by the telephone exchange 601 and the PC-ID is generated by the telephone exchange 601, so that the user of the personal computer 700 is not able to rewrite the part of the PC-ID that is based on the telephone number. This makes it impossible for a user of a personal computer to impersonate another user.

As process (2), the PC-ID that is generated as described above is transmitted from the telephone exchange 601 to the authentication server 800 via the Internet.

On receiving the PC-ID, as process (3) the authentication server 800 registers the PC-ID along with the other information (the user information, the mobile ID, the navigation ID, and the service ID) in the authenticated user database 810.

Figure 15:
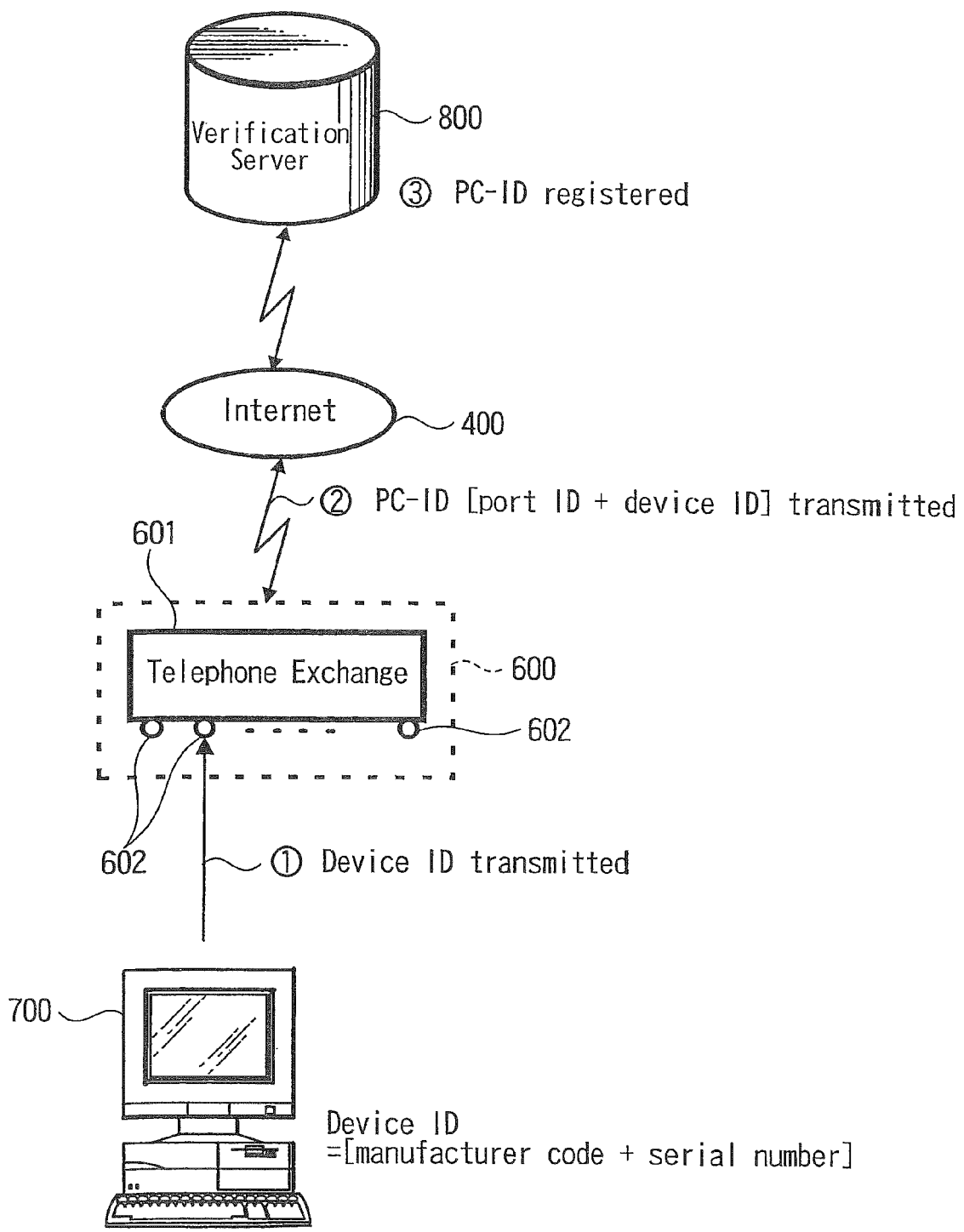
FIG. 15 is a conceptual diagram of a second example procedure for registering a PC-ID in the present embodiment.

A second example procedure for the registration of the PC-ID is shown in FIG. 15. In this second example, the access communication network 600 is a communication network, such as an ADSL network, that can function as a permanent Internet connection.

When this kind of communication network is used, the telephone exchange 601 provided on the access communication network 600 can be equipped with a port unit, such as a splitter that branches between a standard telephone line and an Internet connection. In FIG. 15, such port units are shown as the connection ports 602.

As one example, when a user subscribes to the ASDL service, a connection port 602 is constructed at the telephone exchange 601 so as to connect the user's telephone line to the telephone exchange 601. This connection port 602 is managed by the telephone exchange 601 and assigned in a fixed arrangement to the telephone line connecting the personal computer 700 to the telephone exchange 601.

For this reason, in the present embodiment the connection ports 602 in the telephone exchange 601 can be managed by assigning identifiers (port IDs) to the connection ports 602. The port ID assigned to each connection port 602 is unique, so that in the same way as the telephone numbers used in the first example given above, the correspondence between the personal computers 700 connected to the telephone exchange 601 and the port IDs is fixed. Since the port IDs are managed by the telephone exchange 601, this information cannot be tampered with by the user of a personal computer 700.

In this second example, the PC-ID is generated using the port ID. The generation and registration of the PC-ID based on this port ID can be performed according to the following procedure, for example.

First, as process (1), the personal computer 700 transmits its device ID towards the authentication server 800. In this case also, the device ID is generated using the manufacturer code and serial number. Also, the device ID is transmitted to the authentication server 800 along with other information composed of the "user information", the "mobile ID" (telephone number), the "navigation ID" (telephone number), and the "service ID".

Next, as process (2), the received device ID and information on the port number of the connection port assigned to the telephone line used as the ASDL line are used by the telephone exchange 601 in the access communication network 600 to generate the PC-ID. Next, the telephone exchange 601 transmits the PC-ID it has generated in this way to the authentication server 800 via the Internet.

After this, in process (3), the authentication server 800 registers the PC-ID along with the other information (the user information, the mobile ID, the navigation ID, and the service ID) in the authenticated user database 810.

Figure 16:
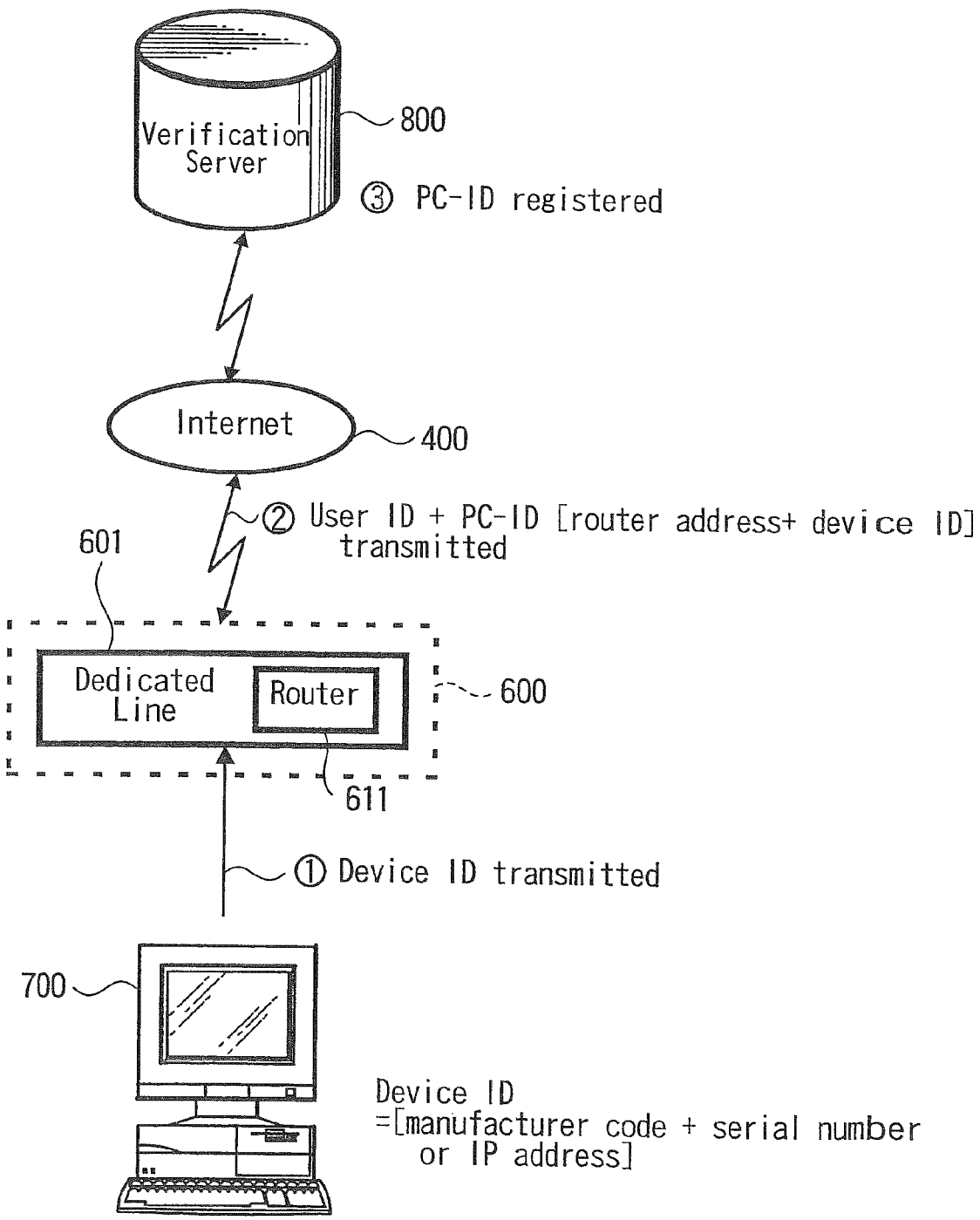
FIG. 16 is a conceptual diagram of a third example procedure for registering a PC-ID in the present embodiment.

A third example procedure for the registration of the PC-ID is shown in FIG. 16. In this third example, the access communication network 600 is a dedicated line 610 to which the personal computer 700 is permanently connected.

In this case, the personal computer 700 is connected to a router 611 that is provided on the dedicated line 610 and connects the personal computer 700 to the Internet. Since the personal computer 700 is permanently connected to the router 611 in this case, the line connecting the personal computer 700 to the router 611 are fixed. The router 611 is managed by the company that operates the dedicated line 610, so that the information relating to the router 611 cannot be tampered with by the user of the personal computer 700.

In this third example, the device ID of the personal computer 700 and information that is unique to the router 611 are used to generate the PC-ID. In this case, a router address that has been assigned to the router 611 is used as the information that is unique to the router 611.

The following describes the third example procedure for the registration of the PC-ID.

First, as process (1), the personal computer 700 transmits its device ID towards the authentication server 800. In this case also, the device ID is transmitted to the authentication server 800 along with other information composed of the "user information", the "mobile ID" (telephone number), the "navigation ID" (telephone number), and the "service ID".

In this case, the device ID is the same as in the first and second example procedures explained above, and so may be generated using information made up of the manufacturer code and serial number. However, since the current premise is that the personal computer 700 is permanently connected, once an IP address has been assigned to the personal computer 700 by a protocol like DHCP (Dynamic Host Configuration Protocol), for example, this IP address will not be changed. As a result, this IP address may be used as the device ID.

Next, as process (2), the received device ID and the router address of the router 611 to which the personal computer 700 is connected are used by the dedicated line 610 on the access communication network 600 to generate the PC-ID. Next, the PC-ID generated in this way is transmitted from the dedicated line 610 to the authentication server 800 via the Internet.

After this, in process (3), the authentication server 800 registers the PC-ID along with the other information (the user information, the mobile ID, the navigation ID, and the service ID) in the authenticated user database 810.

It should be noted that when the IP address is used as a device ID, the IP address that is assigned by a DHCP server changes every time a connection is established. However, when IPv6 protocol is used, an IP address can be permanently assigned even when a connection is not permanent. As a result, when communication with the Internet is performed using IPv6 protocol, the IP address can be used as the device ID even in the first and second example procedures described above.

In short, in the first to third example procedures described above, the PC-ID is generated using not just the device ID of the personal computer 700 but also a telephone number, a port ID of a connection port, or a router address.

Here, the information on the telephone number, port ID of a connection port, or router address can be thought to be information that specifies the communication path (access path) between the personal computer 700 and the access communication network 600 on the route between the personal computer 700 and the Internet.

As can be understood from the description given thus far, if it is presumed that the communication path for connecting to the access communication network 600 is static, such as when the personal computer 700 is set up indoors, a one-to-one correspondence is established between personal computers 700 and communication paths. This means that a combination of information that specifies the communication path and a device ID may be used to generate a PC-ID that is unique to a personal computer 700.

Also, as explained earlier, this information that specifies the communication path (a telephone number, port ID of a connection port, or router address) is managed in each case by the company that operates the access communication network 600, so that this information cannot be tampered with by a dishonest user of a personal computer 700.

This means that a user of a personal computer 700 cannot tamper with a PC-ID that has been generated from this information. Also, in the present embodiment, the PC-ID is generated not by a personal computer 700 but by equipment present on the access communication network 600 that acts as a relay point, so that the potential for illegal tampering is extremely low.

In other words, the PC-ID in the present embodiment is information that makes it possible to specify a personal computer and makes it possible to stop dishonest users impersonating other users through tampering. As a result, it is possible to stop services from being provided to third parties who use a personal computer 700 to impersonate another user.

It should be noted that for the present invention, information that can identify the first communication network (access path) to which the personal computer 700 connects may even be used. This means that the PC-ID that is used by the present invention may be generated according to methods aside from the example procedures for generating the PC-ID that were shown in FIGS. 14 to 16. In the same way, the access communication network 600 is not restricted to the types of communication network that are shown in FIGS. 14 to 16.

4-6. Example Procedure

The following describes an example of the procedure used in the service providing system of this second embodiment when providing the service that informs a user of the present position of the vehicle. This explanation touches on the description given above and refers to the flowchart shown in FIG. 17. It should be noted that the service that informs a user of the present position of the vehicle is as described in the overview given earlier.

Figure 17:
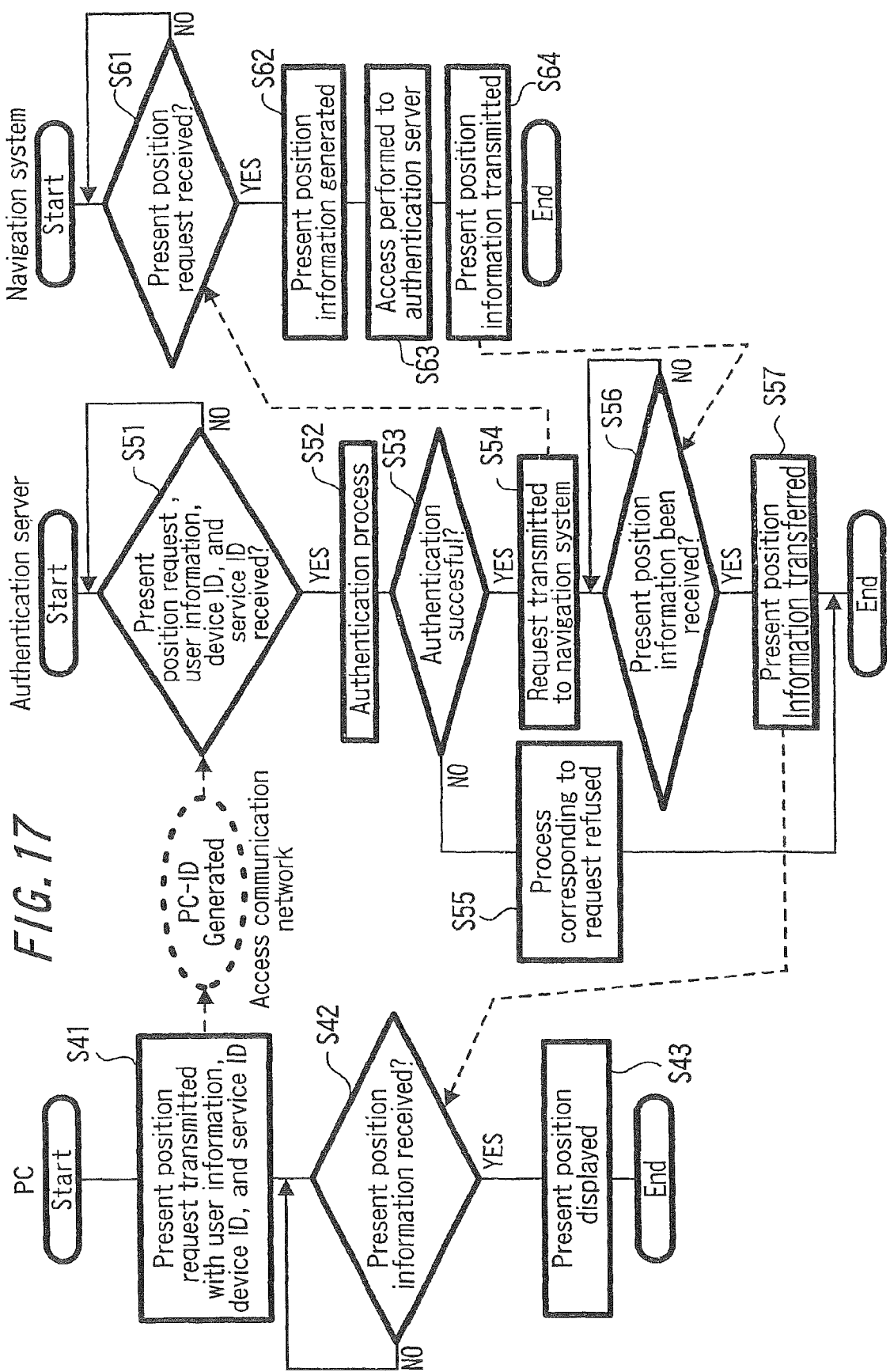
FIG. 17 is a flowchart showing a procedure for providing a service where a personal computer obtains present position information for a navigation system.

In FIG. 17, the processes executed by the personal computer 700, the authentication server 800, and the navigation system 1 are shown in parallel. The process that takes place at the personal computer 700 is executed by the CPU 701, the process that takes place at the authentication server 800 is executed by the control unit 803, and the process that takes place at the navigation system 1 is executed by the control unit 19.

When the user of the personal computer 700 wishes to be informed of the present position of the car in which the navigation system 1 is mounted, as explained earlier the user may launch a web browser application on the personal computer 700 and access a web site that is hosted by the authentication server 800 and provides the service informing users of the present position. After this, the user may perform a predetermined operation in response to the browser display at that point, causing the personal computer 700 to transmit a request for information on the present position. This is shown in FIG. 17 as step S41.

When a request for information on the present position is transmitted in the process in step S41, the user information, device ID, and service ID are also transmitted.

As one example, input boxes that allow the user to input the information that is required for the request may be displayed in the browser display for the service that informs users of the present position. The user information mentioned above is generated, based on personal information (such as the user's name and address) that has been inputted via the input boxes, by the CPU 701 as ID information that identifies the user.

The device ID may be generated from the manufacturer code and serial number, for example. In this case, the CPU 701 generates the device ID based on information for the manufacturer code and serial number that are read from the ROM 702, for example. If the device ID is an IP address, the device ID may be generated using an IP address that is stored in the RAM 703, for example.

As one example, the service ID may be an ID that shows that the present request corresponds to the service that informs users of the present position. This ID may be stored as part of the data construction of a request for present position information.

The request for present position information that is transmitted as described above is first routed to the access communication network 600, as described in the explanation of FIGS. 14 to 16, before being transmitted to the authentication server 800 via the Internet 400. During this process, equipment provided on the access communication network 600 generates a PC-ID using the received device ID and route identifying information (such as a telephone number, port ID, or router address) that is managed by this equipment. As a result, the request for present position information is transmitted to the authentication server 800 together with a PC-ID, user information and a service ID.

In step S51, the authentication server 800 receives the request for present position information, PC-ID, user information and service ID that are transmitted as described above. Next, in step S52, the authentication server 800 performs an authentication process that compares the received user information, PC-ID, and service ID, etc., with the content of the authenticated user database 810.

Next, in step S53, the authentication server 800 judges whether the result of the authentication process in step S52 shows that the user is an authorized user. When this is not the case, the authentication server 800 refuses to perform the process corresponding to the request that has been received, as shown in step S55. In other words, the authentication server 800 does not perform the process for transmitting the present position information to the personal computer 700 in response to the received request. It should be noted that while it is not shown in FIG. 17, it is preferable in step S55 for the authentication server 800 to inform the personal computer 700 that the authentication has been unsuccessful.

On the other hand, when the authentication server 800 judges in step S53 that the authentication has produced a positive result, the process proceeds to step S54 where the authentication server 800 transmits the present position information request it has received to the navigation system 1 in question.

At this point, the authentication server 800 searches the authenticated user database 810 for the navigation ID that is stored so as to be associated with the user information, PC-ID, and service ID received with the present request. The authentication server 800 then indicates the navigation ID (telephone number) it has found and has the request for present position information transmitted to the wireless telephone communication network 300. As a result, a request for present position information is correctly transmitted to the navigation system 1 that is registered as belonging to the owner of the personal computer 700.

The navigation system 1 that is mounted in the car 100, for example, receives the request for present position information in step S61.

In the present embodiment, the navigation system 1 stores a program corresponding to the service that provides present position information. When the information received by the navigation system 1 is a request for present position information, this program generates present position information using the present position measured by the position measuring unit 4 and map information read from the recording medium 9, for example. The program then accesses the authentication server 800 and transmits the generated present position information.

It should be noted that if update information has been received in the manner described above, this update information may be used as the map information used to generate the present position information. Next, the process described as steps S62 to S64 below is executed in accordance with the program.

In step S62, the navigation system 1 generates the present position information.

As described earlier, the present position information generated at this point may be in the form of HTML or XML that can be displayed by a web browser, for example. When a web browser reproduces the present position information, an image showing the present position on a map is displayed. It should be noted that this image data may be generated in a predetermined image format, such as a JPEG (Joint Photographic Experts Group) image, a GIF (Graphics Interchange Format) image or a bitmap.

Next, in step S63, the navigation system 1 executes a control process for performing access to the authentication server 800. To do so, the navigation system 1 may store a URL of the authentication server 800 in the memory 12, for example, with the control unit 19 having an access request for access to this URL transmitted from the communication interface 47 to the communication terminal apparatus 50.

Once a connection to the authentication server 800 is established in accordance with this access request, the process proceeds to step S64 where the present position information generated earlier in step S62 is transmitted to the authentication server 800.

In step S56, the authentication server 800 receives the present position information that has been transmitted in this way and transfers the present position information to the personal computer 700 that made the original request.

The personal computer 700 that requested the present position information is connected to the authentication server 800 as described earlier and is in a state where it is displaying the appropriate web page using a browser. In this state, in step S42 the personal computer 700 receives the present position information that is transferred from the authentication server 800.

As described earlier, the present position information that is received in this way is in the form of a file written using HTML, XML, or the like. In step S43, the personal computer 700 performs a reproduction process for this present position information and has the present position displayed as an image on the browser.

It should be noted that the transmission of the present position information from the navigation system 1 to the personal computer 700 is performed via the authentication server 800. In this way, information can be easily transmitted from the navigation system 1 by having the information relayed by the authentication server 800 using the connection between the personal computer 700 and the authentication server 800. However, when information is being transmitted from the navigation system 1, there is no particular need to perform an authentication process, so that the system can be constructed so that the navigation system 1 directs transmits information to the personal computer 700.

Also, it should be obvious that the authentication server 800 does not have to be provided as a single apparatus. As one example, the process load can be lessened by using a construction where several apparatuses that are distributed over the Internet function as the authentication server 800.

Also, the following supplementary construction may be used to prevent unauthorized acts.

As one example, in the service providing system of the present embodiment, the devices (navigation system, mobile phone, personal computer, etc.) that are registered as being used by a particular user to receive the provided services may all connect to the Internet using a specified communication company (such as a telephone company). A monitoring server may also be provided on the communication network over the range covered by this communication company.

This monitoring server monitors the communication between the devices that are registered for the user and checks whether a line that is present in a specified area covered by the communication company is being used. When there is an attempt to communicate with a device that is registered for the user using a line that is outside the specified area covered by the communication company, the monitoring server may warn the user or may cut off the communication if the line is being used to make unauthorized use of a service. The present invention is also not limited to the embodiments described above. As one example, a variety of other services may be provided to users. Also, the devices that are able to make use of these services are not limited to car navigation apparatuses, mobile phones, and personal computers. As one example, a device that is equipped with a mobile communication terminal apparatus capable of connecting to a network like the Internet may be used, as may a device that is equipped not with a mobile communication terminal apparatus but with a communication terminal apparatus that can connect to the Internet via a specified communication network.

While the second embodiment of the present invention is described by way of a particular example of a service where present position information is provided using the navigation system 1 and the personal computer 700, a variety of other services may be provided. It is also possible for such services to be provided through communication performed between the personal computer 700 and the mobile phone 200. It should also be obvious that in such cases, communication can be performed by having the personal computer 700 perform access via the authentication server 800 to stop dishonest users making unauthorized use of services.

In the present invention described above, services are provided to a car navigation system (an electronic appliance) that is capable of connecting to a communication network such as the Internet using wireless communication, for example. A navigation ID (device ID) that has been uniquely assigned to the car navigation system is managed by the server, so that access can be performed to a particular car navigation system, out of the car navigation systems that exist as countless terminals on the Internet. The data communication that is required to achieve this service is then performed with the particular car navigation system to which the service is to be provided.

In a conventional system, for example, access must first be performed by a navigation system, with a server only being able to wait for access before it can supply the service information. With the present invention, on the other hand, a server or a mobile phone (mobile communication terminal apparatus) can perform access to a specific car navigation system, so that services with a necessary content can be provided at the most appropriate opportunity. Also, operating in this way makes it very easy to introduce new types of services that can be provided to users. Accordingly, it is easier for a user who has purchased a navigation system, for example, to make use of provided services. For manufacturers and retailers, too, there is an increase in the value of the services provided, so that a positive effect on sales can be expected.

Communication performed from a communication terminal apparatus (such as a personal computer) that is statically set up indoors to an electronic appliance (such as a navigation system) also passes through an authentication server. When the communication terminal apparatus accesses the authentication server in order to communicate with the electronic appliance, information that identifies the access path (such as a telephone number, port number, router address, etc.) is used to generate the terminal ID (PC-ID). After this, the authentication server uses this terminal ID when performing the authentication process.

The information that identifies the access path is normally managed by the company that operates the first communication network to which the communication terminal apparatus connects. This makes it impossible for the communication terminal apparatus to tamper with this information, so that the terminal ID is safe from tampering by dishonest users. This means that by using a simple construction, the present invention can prevent dishonest users from impersonating a registered user and making unauthorized use of the provided services.

INDUSTRIAL APPLICABILITY

The present invention is a system that is constructed so as to enable communication to be performed, via a communication network, between an electronic appliance that is mounted in a moving object, such as a car, and a server or a personal mobile communication terminal apparatus, such as a mobile phone. This system provides services to a user who has bought the electronic appliance, for example, by transmitting data to the electronic appliance and having the electronic appliance execute some kind of operation in accordance with the received data.

The invention claimed is:

1. A service providing method comprising:
    transmitting, from a computer device to an authentication server via an access communication network, a request for information on a present position of an electronic appliance operable to generate present position information, wherein the electronic appliance is equipped with a wireless communication function and the computer device is equipped with a communication function;
    wherein the request for information on a present position is routed to the authentication server via the access communication network with a computer device identifier, wherein the computer device identifier is generated using information identifying the computer device included in the request for information on a present position and information identifying a path managed by the access communication network on which the request for information on a present position is transmitted from the computer device;
    transmitting the request for information on a present position, from the authentication server over a wireless communication network to the electronic appliance, when the authentication server judges, using the computer device identifier, that the request for information on a present position is authentic; and
    receiving at the computer device present position information transmitted from the electronic appliance via the wireless communication network, wherein the present position information is generated at the electronic appliance responsive to the request for information on a present position from the authentication server.

2. The method of claim 1, wherein the computer device identifier is generated using information identifying a user included with the request for information on a present position from the computer device.

3. The method of claim 1, wherein the computer device identifier is generated by means on the access communication network.

4. The method of claim 1, wherein the authentication server judges that the request for information for a present position is authentic by comparing the computer device identifier with information associated with the electronic appliance.

5. The method of claim 4, wherein the information identifying the electronic appliance is stored in a database of the authentication server.

6. The method of claim 1, wherein the present position information is transmitted to the computer device via the authentication server.

7. The method of claim 1, wherein the authentication server provides a service for supplying the computer device with the present position information from the electronic appliance responsive to the transmitting of the request for information on a present position from the computer device.

8. A service providing apparatus comprising:
an authentication server to transmit, over a wireless communication network, to an electronic appliance operable to generate present position information, a request for information on a present position from a computer device, when the authentication server judges, using a computer device identifier, that the request for information on a present position is authentic,
wherein the request for information on a present position is routed to the authentication server via an access communication network with the computer device identifier, the computer device identifier being generated using information identifying the computer device included in the request for information on a present position and information identifying a path managed by the access communication network on which the request for information on a present position is transmitted from the computer device, and
wherein the present position information is generated at the electronic appliance and transmitted to the computer device, responsive to the request for information on a present position from the authentication server.

9. The apparatus of claim 8, wherein the computer device identifier is generated using information identifying a user included with the request for information on a present position from the computer device.

10. The apparatus of claim 8, wherein the computer device identifier is generated by means on the access communication network.

11. The apparatus of claim 8, wherein the authentication server judges that the request for information for a present position is authentic by comparing the computer device identifier with information associated with the electronic appliance.

12. The apparatus of claim 11, wherein the information identifying the electronic appliance is stored in a database of the authentication server.

13. The apparatus of claim 8, wherein the present position information is transmitted to the computer device via the authentication server.

14. The apparatus of claim 8, wherein the authentication server provides a service for transmitting the request for information on a present position from, and receiving the present position information at, the computer device.

15. A navigation device comprising:
a wireless communication terminal operable to transmit and receive information over a wireless communication network; and
a control unit including a processor, wherein the processor is operable to use service information received at the wireless communication terminal from a service providing system to realize at the navigation device a predetermined service provided by the service providing system,
wherein the service providing system has functions for providing the predetermined service including:
transmitting, from a computer device to an authentication server via an access communication network, a request for information on a present position of the navigation device, wherein the request for information on a present position is routed to the authentication server via the access communication network with a computer device identifier, wherein the computer device identifier is generated using information identifying the computer device included in the request for information on a present position and information identifying a path managed by the access communication network on which the request for information on a present position is transmitted from the computer device;
receiving at the navigation device the request for information on a present position transmitted over a wireless communication network from the authentication server, when the authentication server judges, using the computer device identifier, that the request for information on a present position is authentic; and
transmitting from the navigation device via the wireless communication network to the computer device present position information, wherein the present position information is generated responsive to the request for information on a present position from the authentication server.

16. The navigation device of claim 15, wherein the computer device identifier is generated using information identifying a user included with the request for information on a present position from the computer device.

17. The navigation device of claim 15, wherein the computer device identifier is generated by means on the access communication network.

18. The navigation device of claim 15, wherein the authentication server judges that the request for information for a present position is authentic by comparing the computer device identifier with information associated with the electronic appliance.

19. The navigation device of claim 18, wherein the information identifying the electronic appliance is stored in a database of the authentication server.

20. The navigation device of claim 15, wherein the present position information is transmitted to the computer device via the authentication server.

21. The navigation device of claim 15, wherein the authentication server provides a service for supplying the computer device with the present position information from the electronic appliance responsive to the transmitting of the request for information on a present position from the computer device.

* * * * *